US012671074B2

(12) United States Patent
Amouzegar et al.

(10) Patent No.: US 12,671,074 B2
(45) Date of Patent: Jun. 30, 2026

(54) PROCESSES FOR THE ALKALIATION OR RE-ALKALIATION OF AN ELECTRODE ACTIVE MATERIAL

(71) Applicant: HYDRO-QUÉBEC, Montréal (CA)

(72) Inventors: Kamyab Amouzegar, Mont-Royal (CA); François Larouche, Mont-St-Hilaire (CA); Pascal Champagne, Trois-Rivières (CA); Georges Houlachi, Pointe-Claire (CA); Patrick Bouchard, Shawinigan (CA); Karim Zaghib, Longueuil (CA)

(73) Assignee: HYDRO-QUÉBEC, Montreal (CA)

( * ) Notice: Subject to any disclaimer, the term of this patent is extended or adjusted under 35 U.S.C. 154(b) by 1000 days.

(21) Appl. No.: 17/770,817

(22) PCT Filed: Nov. 13, 2020

(86) PCT No.: PCT/CA2020/051547
§ 371 (c)(1),
(2) Date: Apr. 21, 2022

(87) PCT Pub. No.: WO2021/092692
PCT Pub. Date: May 20, 2021

(65) Prior Publication Data
US 2022/0393146 A1 Dec. 8, 2022

Related U.S. Application Data

(60) Provisional application No. 62/934,782, filed on Nov. 13, 2019.

(51) Int. Cl.
*H01M 4/04* (2006.01)
*H01M 4/58* (2010.01)
(Continued)

(52) U.S. Cl.
CPC ....... *H01M 4/0452* (2013.01); *H01M 4/0404* (2013.01); *H01M 4/5825* (2013.01);
(Continued)

(58) Field of Classification Search
CPC ............. H01M 4/0452; H01M 4/0404; H01M 4/5825; H01M 4/623; H01M 4/625; H01M 10/0525; H01M 2220/20; H01M 2220/30
See application file for complete search history.

(56) References Cited

U.S. PATENT DOCUMENTS

| 5,496,663 A | 3/1996 | Walk et al. |
| 9,287,552 B2 | 3/2016 | Sloop |

(Continued)

FOREIGN PATENT DOCUMENTS

| CN | 1663063 A | 8/2005 |
| CN | 1926701 A | 3/2007 |

(Continued)

OTHER PUBLICATIONS

Lee—2014 ("A review of recent developments in membrane separators for rechargeable lithium-ion batteries," Energy Environ. Sci. 2014, 7, 3857-3886). (Year: 2014).*

(Continued)

*Primary Examiner* — James Lin
*Assistant Examiner* — Kevin Sylvester
(74) *Attorney, Agent, or Firm* — Womble Bond Dickinson (US) LLP

(57) ABSTRACT

Processes are described for the direct or indirect electrochemical alkaliation of an alkali metal deficient electrochemically active material. The processes include an electrolysis step either during the alkaliation of the alkali metal deficient electrochemically active material on an electrode current collector (direct) or during the regeneration of a (Continued)

reducing agent used for the alkaliation of the electrochemically active material (indirect).

18 Claims, 23 Drawing Sheets

(51) Int. Cl.
H01M 4/62 (2006.01)
H01M 10/0525 (2010.01)

(52) U.S. Cl.
CPC .......... H01M 4/623 (2013.01); H01M 4/625 (2013.01); H01M 10/0525 (2013.01); H01M 2220/20 (2013.01); H01M 2220/30 (2013.01)

(56) References Cited

U.S. PATENT DOCUMENTS

| | | | |
|---|---|---|---|
| 9,598,789 B2 | 3/2017 | Grant et al. | |
| 2016/0049701 A1 | 2/2016 | Kepler et al. | |
| 2018/0040914 A1 | 2/2018 | Grant et al. | |
| 2018/0261894 A1 | 9/2018 | Wang et al. | |
| 2019/0207275 A1* | 7/2019 | Amouzegar | ............ C22B 26/12 |

FOREIGN PATENT DOCUMENTS

| | | | | | |
|---|---|---|---|---|---|
| CN | 102881865 A | * | 1/2013 | | |
| CN | 102790214 B | * | 7/2014 | | |
| CN | 104081573 A | | 10/2014 | | |
| CN | 105024106 A | * | 11/2015 | | |
| CN | 103276406 B | | 4/2017 | | |
| CN | 107431191 A | | 12/2017 | | |
| CN | 108140851 A | | 6/2018 | | |
| CN | 108292759 A | | 7/2018 | | |
| CN | 108463908 A | | 8/2018 | | |
| CN | 108780884 A | | 11/2018 | | |
| CN | 109075407 A | | 12/2018 | | |
| CN | 109659487 A | | 4/2019 | | |
| CN | 109837392 A | | 6/2019 | | |
| CN | 110600735 A | * | 12/2019 | ............ | C01B 25/26 |
| KR | 10-2014-0018538 A | | 2/2014 | | |
| KR | 10-2017-0084472 A | | 7/2017 | | |
| WO | 2013018758 | | 2/2013 | | |
| WO | 2015/121684 | | 8/2015 | | |
| WO | 2016087716 A1 | | 6/2016 | | |
| WO | 2018187731 A1 | | 10/2018 | | |
| WO | 2019070896 A1 | | 4/2019 | | |
| WO | 2019/172661 | | 9/2019 | | |

OTHER PUBLICATIONS

Trinh—2018 ("Structural changes in the electrochemically cycled LiMn0.7Fe0.3PO4," Solid State Ionic 2018, 324, 33-39). (Year: 2018).*

Grgur—2006 ("Electrochemical oxidation of iodide in aqueous solution," Chem. Engineer. J. 2006, 124, 47-54). (Year: 2006).*

CRC Handbook of Chemistry and Physics (91st Edition, 2010-2011, p. 8-20 to 8-29), (Year: 2010).*

Wiki—HI ("Hydroiodic acid" entry from Wikipedia.com accessed via the wayback machine for the webpage as of Sep. 9, 2018). (Year: 2018).*

Battaglia—2008 ("Effects of Various Conductive Additive and Polymeric Binder Contents on the Performance of a Lithium-Ion Composite Cathode," J. Electrochem. Soc. 2008, 155, A887-A892). (Year: 2008).*

The CRC Handbook of Chemistry and Physics, 88th Edition (Editor-in-Chief: David R. Lide, National Institute of Standards and Technology, CRC Press/Taylor & Francis Group: Boca Raton, FL. 2007; p. 4-43 to 4-101). (Year: 2007).*

Yu et. al. ("A redox targeting-based material recycling strategy for spent lithium ion batteries," Energy Environ. Sci. 2019, 12, 2672-2677). (Year: 2019).*

Partial European Search Report (ESR) issued in European application No. 20887315.8 mailed on Mar. 5, 2025.

Kanoh Hirofumi et al : "Selective Electroinsertion of Lithium Ions into a Pt/X-MnOz Electrode in the Aquesous Phase", Langmuir, vol. 7, Sep. 1, 1991 (Sep. 1, 1991), pp. 1841-1842.

International Search Report (PCT/ISA/210) with translation and Written Opinion (PCT/ISA/237) mailed on Jan. 29, 2021, by the Canadian Patent Office as the International Searching Authority for International Application No. PCT/CA2020/051547.

Intaranon, et al., "Selective Lithium Extraction from Brines by Chemical Reaction with Battery Materials", Journal of Materials Chemistry A, Mar. 27, 2014, vol. 2, pp. 6374-6377.

Padhi, et al., "Phospho-olivines as Positive-Electrode Materials for Rechargeable Lithium Batteries", Journal of the Electrochemical Society, Apr. 1997, vol. 144, No. 4, pp. 1188-1194.

Zhang, et al., "Electrochemical Telithiation for Direct Regeneration of LiCoO2 Materials from Spent Lithium-Ion Battery Electrodes", ACS Sustainable Chem. Eng., Jul. 29, 2020, vol. 8, pp. 11596-11605.

Office Action for corresponding Chinese Patent Application 202080078863.4, dated Aug. 30, 2024.

Office Action for corresponding Chinese Patent Application 202080078863.4, dated Jan. 15, 2024.

Extended European Search Report (EESR) issued in European application No. 20887315.8 mailed on Jul. 3, 2025.

Office Action in Korean application No. 10-2022-7019145 mailed on Jul. 10, 2025.

* cited by examiner

PROCESSES FOR THE ALKALIATION OR RE-ALKALIATION OF AN ELECTRODE ACTIVE MATERIAL

RELATED APPLICATION

This application claims priority under the applicable law to U.S. provisional patent application No. 62/934,782 filed on Nov. 13, 2019, the content of which is incorporated herein by reference in its entirety for all purposes.

TECHNICAL FIELD

The present technology generally relates to the field of processes for intercalating or re-intercalating alkali metal ions into electrochemically active materials, for example, for the production of metal oxides and phosphates comprising an alkali metal.

BACKGROUND

In lithium battery manufacturing, the positive electrode is generally produced by coating a suspension of active material, conductive material, and binder on a current collector, usually an aluminum foil, followed by drying. The active material is commonly a lithiated metal oxide or a lithiated metal phosphate, where the metal can be a transition metal or a combination of two or more transition metals. The electrochemical cell is usually assembled with a negative electrode and a separator in a discharged state, i.e., the positive electrode being fully lithiated. An exception is the active material V2O5, which is applied in its non-lithiated form on the current collector. In such a case, the battery is assembled in a fully charged state, which represents a serious safety and fire hazard.

The Walk et al. group has described a pre-lithiation process of V2O5 electrodes under electrochemical conditions using metallic lithium as negative electrode (see U.S. Pat. No. 5,496,663). Such a lithiation process is considered as being galvanic and requires the use of aprotic and non-aqueous electrolytes due to the presence of metallic lithium as the necessary source of lithium and its incompatibility with various solvents, especially aqueous solutions. Another drawback of this approach is related to the fact that metallic lithium is not the most advantageous lithium source both from an economic point of view and in terms of precautions needed when it is used in a large-scale process.

The use of metallic lithium or metallic lithium alloys for re-lithiation in organic solvents has also been proposed for other electrode materials by Liu et al. (see PCT publication No. WO2019/070896 A1). However, this approach is also based on the use of metallic lithium (or one of its alloys) applied directly on the electrode material and organic electrolytic solvents in a complex multi-step process involving steps such as the formation of a pouch cell, waiting for a long period of time (usually beyond 20 hours) and then peeling off the excess metallic lithium.

In order to avoid the aforementioned drawbacks of using metallic lithium as the lithium source in the lithiation process, others have proposed the use of less expensive materials such as lithium chloride (instead of metallic lithium) in an organic solvent (see Grant et al., U.S. Patent Application No. US2018/0040914). In this process, the electrode materials in which lithium is intercalated are lithium-ion battery anode materials of the graphite, silicon oxide, and tin oxide types. The lithium halides used in the process generate toxic and corrosive halogen gases at the counter electrode. The halogen gases can also react with any residual water in the set-up and produce more corrosive acids such as HCl or HF, which involves additional precautions to be taken during the process.

Another group presented a reconstruction of lithium-depleted battery electrode materials (see Sloop, U.S. Pat. No. 9,287,552). Various approaches are described therein including a high-temperature solid-state reaction, a hydrothermal process carried out in a sealed pressured vessel, and the use of reducing conditions, which could potentially be carried out in situ by introducing a reducing solution directly into a spent battery. The latter approach does not take into account the fact that lithium deficiency is not the only defect in a spent battery. Indeed, the electrode can also exhibit fractures of the active material and of the binder, lithium anti-sites, a passivation layer, a detachment of the current collector, a reducing deposition of copper onto the cathode surface, corrosion of current collector, etc. Moreover, Sloop proposes that the positive electrode be separated intact from the battery, which is very difficult to implement on a large scale, for example, including extraction of the electrode roll ("jelly-roll") from a spent battery, unrolling and sorting of the electrodes, while handling the entire electrode strip for subsequent steps. Such a separated electrode will also have the above-mentioned additional defects. Sloop also refers to, but does not demonstrate, the relithiation of the spent positive electrode, the latter being in pieces deposited in an electrically charged tray or grid. Poor electrical contact between the electrode pieces and the tray or grid will result in uneven current and potential distribution favoring other electrochemical reactions (such as hydrogen evolution) and leading to a low current efficiency and uneven relithiation throughout the electrode.

Accordingly, there is a need for new processes for the alkaliation or re-alkalnation of active electrode materials, including processes that can be used in the preparation of a new electrode material or for the recycling thereof.

SUMMARY

According to a first aspect, the present document relates to a process for the electrochemical alkaliation of an electrochemically active material, the process comprising the steps of:

a) obtaining a working electrode comprising a working electrode material on a current collector, the working electrode material comprising the electrochemically active material, optionally a binder and/or an electronically conductive material;

b) introducing the working electrode in an electrochemical reactor in continuous and/or batch mode with an inert counter electrode, and a solution comprising an alkali metal salt in a solvent;

c) applying a direct current between the working electrode and the counter electrode to obtain an alkaliated electrode comprising an alkaliated electrochemically active material; and d) removing the alkaliated electrode obtained in step (c) from the electrochemical reactor;

wherein the electrochemically active material comprises a metal oxide (including complex oxides), metal phosphate, metal silicate, metal sulfate, or a partially alkaliated metal oxide (including complex oxides), metal phosphate, metal silicate, or metal sulfate.

According to an embodiment, the electrochemically active material is alkali metal deficient. In another embodiment, the process comprises converting an electrochemically active material of Formula I:

$$A_{w-p}M^{n+p}{}_xX_yO_z \qquad (I)$$

into an alkaliated electrochemically active material of Formula II:

$$A_wM^n{}_xX_yO_z \qquad (II)$$

wherein,

A is an alkali metal;

M is a transition metal, a post-transition metal or a combination thereof;

X is selected from P, Si and S;

O is an oxygen atom;

w is selected from the numbers 1 to 4 and corresponds to the number of A atoms in the alkaliated electrochemically active material;

x is selected from the numbers 1 to 5 and corresponds to the number of M atoms;

y is selected from the numbers 0 to 2, wherein X is absent when y is zero;

z is selected from the numbers 1 to 12 and corresponds to the number of oxygen atoms in the formulae;

n indicates the oxidation state of M;

p in Formula I indicates both the average number of missing A atoms and the average increase in the oxidation state of M, wherein p w (preferably 0<p 1); and wherein w, y, z, n and p are selected to provide a stable, electroneutral compound.

In another embodiment, p=w, A is absent in Formula I, and the electrochemically active material of Formula I is of Formula I(a):

$$M^{n+p}{}_xX_yO_z.$$

In another embodiment, X is phosphorus, y is 1, and z is 4. In another embodiment, M is Fe, Ni, Mn, Co, or a combination at least two thereof. In an alternative embodiment, M is V, Mn, Ni, Co, Fe, Cr, Ti, Zr, Sn or a combination of at least two thereof. In yet another embodiment, y is 0 and X is absent. According to some preferred embodiments, A is Li, Na or K, or A is Li.

In another embodiment, the electrochemically active material or alkaliated electrochemically active material is further doped by the partial substitution of M with a transition metal (e.g., V, Cr, Mn, Fe, Co, Ni, Cu, Zn, Mo, W, or Y) and/or a metal other than a transition metal (e.g., Mg, Ca, Sr, Al, Sb, or Sn).

In an additional embodiment, the solvent is selected from an aqueous solvent, an organic solvent or a mixture thereof, for example, the solvent is water.

In other embodiments, the alkali metal salt comprises at least one of an alkali metal sulfate, carbonate, bicarbonate, hydroxide, nitrate, acetate, oxalate, or phosphate salt. In one embodiment, the alkali metal salt is an alkali metal sulfate. In another embodiment, the alkali metal salt is an alkali metal bicarbonate, for example, where step (b) and/or (c) is carried out in the presence of gaseous carbon dioxide. In another embodiment, the process further comprises a step of adjusting the pH of the solution to a pH adapted to the electrochemically active material of step (a) (e.g., for $FePO_4$, the pH is adjusted to between 5 and 9, preferably between 6 and 7.5). In one embodiment, the alkali metal of the alkali metal salt is lithium.

In other embodiments, step (c) is carried out in a continuous or batch mode. In another embodiment, step (c) is carried out in a continuous mode wherein the working electrode is introduced into the electrochemical reactor on one side and moves along a defined path such that the working electrode remains at a constant distance from the counter electrode while moving along an electrochemically active area of the electrochemical reactor to maintain a relatively uniform current and potential distribution. In another embodiment, the speed at which the working electrode moves through the electrochemical reactor is adjusted based on the residence time required for a desired level of alkaliation at an applied current density.

In yet another embodiment, step (c) is carried out in a controlled current density mode between the working electrode and the counter electrode. Alternatively, step (c) is carried out in a controlled voltage mode between the working electrode and the counter electrode.

In other embodiments, the electrochemically active material is $FePO_4$ or a partially delithiated $LiFePO_4$ and the current density at the working electrode is in the range of from 0.001 Ng to 100 A/g of active $LiFePO_4$, preferably in the range of from 1 to 15 Ng of active $LiFePO_4$.

In another embodiment, step (c) is carried out at a temperature in the range of from 5° C. to 90° C., preferably from 25° C. to 50° C. In some embodiments, step (b) can further comprise a reference electrode.

In other embodiments, the above process further comprises a step (e) of washing the alkaliated electrochemically active electrode material of the alkaliated electrode and/or a step of drying the alkaliated electrochemically active electrode material of the alkaliated electrode.

In yet other embodiments, the working electrode material comprises a binder, the binder being selected from fluorine-containing polymeric binders and other solvating polymeric binders. According to one embodiment, the binder is a fluorine-containing polymeric binder such as PVDF, HFP, PVDF—Co—HFP or PTFE. According to another embodiment, the binder is a solvating polymeric binder selected from poly(ethylene oxide), poly(propylene oxide), poly(dimethylsiloxane), poly(alkylene carbonate), poly(alkylenesulfone), poly(alkylenesulfamides), polyurethanes, poly(vinyl alcohol), and copolymers (block, random, alternating, statistical, etc.) comprising at least one of the above polymers or monomers thereof, as well as a combination at least two thereof, said polymers being optionally branched and/or crosslinked.

In another embodiment, the working electrode material comprises an electronically conductive material, which is selected from the group consisting of carbon black (such as Ketjen™ black and Super P™), acetylene black (such as Shawinigan black and Denka™ black), graphite, graphene, carbon fibers or nanofibers (such as vapor grown carbon fibers (VGCFs)), carbon nanotubes (e.g., single-walled or multi-walled), and a combination of at least two thereof.

In some embodiments, the working electrode material is an electrode material (e.g., a positive electrode material) from a spent battery and step (a) comprises at least one step of separating the electrode material from the other elements of the spent battery and applying said material on the current collector.

In other embodiments, step (a) comprises mixing in a solvent the electrochemically active material, the binder and optionally the electronically conductive material, applying the mixture on the current collector and drying.

According to a second aspect, the present document relates to an electrode obtained by a process as defined above.

According to a third aspect, the present document relates to a process for the electrochemical alkaliation of an electrochemically active material, the process comprising the steps of:

(i) addition of the electrochemically active material to a solution containing a reducing agent and an alkali metal salt in a solvent to produce an alkaliated electrochemically active material;

(ii) separation of the alkaliated electrochemically active material from the solution; and (iii) electrochemical treatment of the solution separated in step (ii) to regenerate the reducing agent in the solution.

In one embodiment, the electrochemically active material and the alkaliated electrochemically active material are as herein defined. According to another embodiment, the electrochemically active material is alkali metal deficient. In another embodiment, the reducing agent is the reducing member of a redox couple having a redox potential lower than that of the electrochemically active material (alkali metal deficient) to be reduced. According to one embodiment, the redox couple comprises an Fe(II)/Fe(III) complex, for example, selected from $$[Fe(CN)_6]^{3-} / [Fe(CN)_6]^{4-},$$

$[Fe(nta)]/[Fe(nta)]^-$, $[Fe(tdap)]^{2-}/[Fe(tdap)]^{3-}$, $[Fe(edta)]^-/$ $[Fe(edta)]^{2-}$, $[Fe(citrate)]/[Fe(citrate)]^-$, $[Fe(TEOA)OH]^-/$ $[Fe(TEOA)OH]^-$, and $[Fe(oxalate)]+/[Fe(oxalate)]$.

According to one embodiment, step (i) further comprises a step of deoxygenating the solution. According to another embodiment, steps (i) and/or (iii) are carried out in the presence of a gas allowing to eliminate the presence of oxygen.

In another embodiment, the alkali metal salt is selected from an alkali metal sulfate, carbonate, bicarbonate, hydroxide, nitrate, acetate, oxalate, phosphate, and combinations thereof. In one embodiment, the alkali metal salt is an alkali metal sulfate. In another embodiment, the alkali metal salt is an alkali metal bicarbonate, for example, where step (i) is carried out in the presence of gaseous carbon dioxide. In another embodiment, the process further comprises a step of adjusting the pH of the solution to a pH adapted to the electrochemically active material of step (i) (e.g., for $FePO_4$, the pH is adjusted between 5 and 9, preferably between 6 and 7.5). In one embodiment, the alkali metal of the salt is lithium. In another embodiment, the solvent is an aqueous solvent.

According to one embodiment, the electrochemical treatment step (iii) is carried out in an electrolytic cell by passing a current between at least one cathode and at least one anode. In one embodiment, the electrolytic cell comprises at least one ionic or non-ionic separator installed between the anode and the cathode to protect the regenerated reducing agent. In another embodiment, the electrolytic cell further comprises a system for keeping the solution deoxygenated, for example, the system comprising maintaining an oxygen-free gas in the electrolytic cell, such as carbon dioxide, nitrogen or argon.

In yet another embodiment, the electrochemically active material is in the form of a suspension in the solution of step (i), and step (ii) is carried out by filtration, centrifugation or decantation, optionally followed by a washing step.

Alternatively, the electrochemically active material is comprised in an electrode material on a current collector (forming an electrode) and step (ii) comprises removing the electrode from the solution, optionally followed by a washing step.

In one embodiment of this alternative, the electrode material further comprises a binder, for example, selected from fluorine-containing polymeric binders and other solvating polymeric binders. According to one embodiment, the binder is a fluorine-containing polymeric binder (such as PVDF, HFP, PVDF—Co—HFP or PTFE). Alternatively, the binder is a solvating polymeric binder selected from poly (ethylene oxide), poly(propylene oxide), poly(dimethylsiloxane), poly(alkylene carbonate), poly(alkylenesulfone), poly(alkylenesulfamides), polyurethanes, poly(vinyl alcohol), and copolymers (block, random, alternating, statistical, etc.) comprising at least one of the above polymers or monomers thereof, as well as a combination of at least two thereof, these polymers being optionally branched and/or cross-linked. According to another embodiment, the electrode material further comprises an electronically conductive material, for example, selected from the group consisting of carbon black (such as Ketjen™ black and Super P™), acetylene black (such as Shawinigan black and Denka™ black), graphite, graphene, carbon fibers or nanofibers (such as vapor grown carbon fibers (VGCFs)), carbon nanotubes (e.g., single-walled or multi-walled), and a combination of at least two thereof.

In another embodiment, the process further comprises drying the alkaliated electrochemically active material.

According to a fourth aspect, the present document relates to an electrode comprising the alkaliated electrochemically active material obtained by a process as herein defined, a binder and optionally an electronically conductive material.

According to a fifth aspect, the present document relates to an electrochemical cell comprising a negative electrode, a positive electrode and an electrolyte, wherein the positive electrode is an electrode as defined herein, or a battery comprising at least one such electrochemical cell. For example, the battery is a lithium battery or a lithium-ion battery.

In another embodiment, the electrochemical cell or battery as defined herein, is for use in mobile devices, such as cell phones, cameras, tablets or laptops, in electric or hybrid vehicles, or in renewable energy storage.

DETAILED DESCRIPTION

Figure 1:
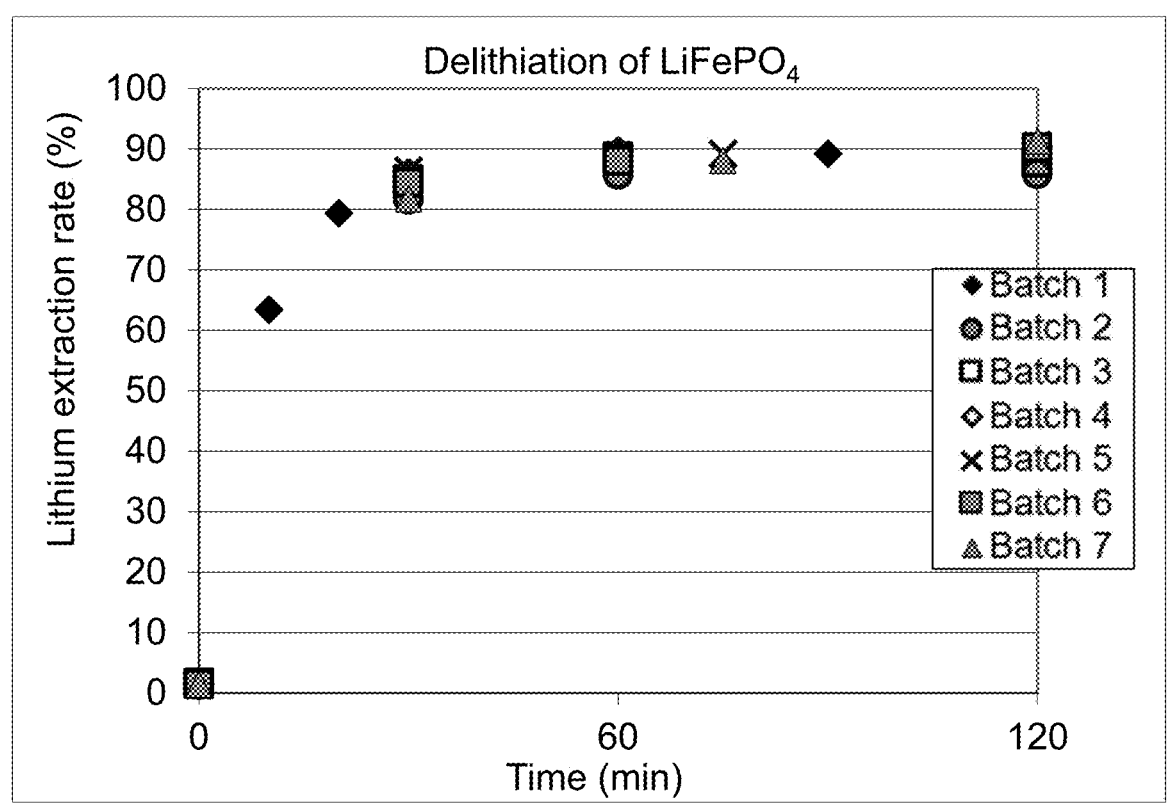
FIG. 1 presents a graph of lithium leaching rate during delithiation as a function of time according to Example 1(a).

The following detailed description and examples are for illustrative purposes and should not be construed as further limiting the scope of the invention.

All technical and scientific terms and expressions used herein have the same definitions as those commonly understood by the person skilled in the art when relating to the present technology. The definition of some terms and expressions used herein is nevertheless provided below for clarity purposes.

When the term "about" is used herein, it means approximately, in the region of, and around. When the term "about" is used in relation to a numerical value, it can modify it, for example, above and below its nominal value by a variation of 10%. This term can also take into account the probability of random errors in experimental measurements or the rounding of a value.

The terms "alkaliating" and "alkaliation" as used herein refer to the reduction of an active material comprising a metal, accompanied by the insertion of alkali metal ions into the active material. The terms "lithiating" and "lithiation" are used when the alkali metal ions are lithium ions. Similarly, the terms "alkaliated" and "lithiated" generally refer to a material resulting respectively from an alkaliation or a lithiation. Similarly, the terms "realkaliating," "realkaliation," "relithiating," and "relithiation" refer to the alkaliation or lithiation of an active material having lost or being deficient in alkali metal ions or lithium ions, respectively.

The present document therefore relates to the alkaliation of an electrochemically active material containing at least one metal in a non-zero oxidation state. A first step in this process is to obtain a working electrode comprising an electrode material on a current collector. The electrode material comprises the electrochemically active material to be alkaliated and can comprise other components. For example, the electrochemically active material is uniformly dispersed in a binder and optionally a conductive material.

The electrochemically active material can generally be defined as comprising metal oxides (including complex oxides), metal phosphates, metal silicates, metal sulfates, or as their partially alkaliated oxides, phosphates, silicates or sulfates. For instance, the electrochemically active material is of Formula I:

$$A_{w-p}M^{n+p}{}_x X_y O_z \qquad (I)$$

wherein,

A is an alkali metal (for example, Li, Na and K, preferably lithium);

M is a transition metal, a post-transition metal or a combination thereof;

X is selected from P, Si and S; and

O represents an oxygen;

w is selected from the numbers 1 to 4 and corresponds to the number of A atoms in the alkaliated electrochemically active material;

x is selected from the numbers 1 to 5 and corresponds to the number of M atoms;

y is selected from the numbers 0 to 2, wherein X is absent when y is zero;

z is selected from the numbers 1 to 12 and corresponds to the number of oxygen atoms in the formula;

n indicates the oxidation state of M;

p indicates both the average number of missing A atoms and the average increase in the oxidation state of M, wherein p w (preferably 0<p 1); and wherein w, y, z, n and p are selected to provide a stable, electroneutral compound. And the alkaliated electrochemically active material obtained by the process is of Formula II:

$$A_wM^n{}_xX_yO_z \qquad (II)$$

wherein A, M, X, O, n, w, x, y, and z are as defined herein.

An electrochemically active material example comprises the compound of Formula I, where p=w, A is absent, and the electrochemically active material of Formula I is of Formula I(a):

$$M^{n+p}{}_xX_yO_z.$$

In some examples, X is phosphorus, y is 1 and z is 4.

Examples of transition metals M include Fe, Ni, Mn, Co or a combination thereof, preferably when X is phosphorus, y is 1 and z is 4. According to another example, the electrochemically active material is $FePO_4$ or a partially delithiated $LiFePO_4$. Examples of M can also include a metal selected from V, Mn, Ni, Co, Fe, Cr, Ti, Zr, Sn or a combination of at least two thereof. In some examples, y is 0 and X is absent, with Formula I representing an oxide or complex oxide.

The electrochemically active material and/or alkaliated electrochemically active material can also be doped by the partial substitution (10 mol % or less, or 5 mol % or less) of M, for instance, with a transition metal (e.g., Ti, V, Cr, Mn, Fe, Co, Ni, Cu, Zn, Mo, W, or Y) and/or a metal other than a transition metal (e.g., Mg, Ca, Sr, Al, Sb, or Sn).

In a first process step, an alkali metal deficient material such as that of Formula I or 1(a) can be mixed with all ingredients needed to prepare an electrode for an energy storage device and applied on a current collector. The material to be alkaliated can be commercially sourced and included in the working electrode material of the present process to achieve alkaliation prior to use as an electrode in an electrochemical cell. Alternatively, the electrochemically active material to be alkaliated can be the result of a battery recycling process.

The electrochemically active material can be in the form of microparticles or nanoparticles and/or may further comprise a carbon coating.

The ingredients for the electrode material can further comprise at least one binder, for example a polymer binder, preferably a polar and solvating polymer binder.

Non-limiting examples of solvating polymers which can be suitable for use as positive electrode binders include fluorine atom-containing polymeric binders such as PVDF, HFP, PVDF—Co—HFP and PTFE. Other examples of solvating polymeric binders include poly(ethylene oxide), poly (propylene oxide), poly(dimethylsiloxane), poly(alkylene carbonate), poly(alkylenesulfone), poly(alkylenesulfamides), polyurethanes, poly(vinyl alcohol), and copolymers (block, random, alternating, statistical, etc.) comprising at least one of the above polymers or monomers thereof, as well as a combination of at least two thereof. These solvating polymers can also be branched and/or crosslinked. Other examples of binders include water-soluble binders such as SBR (styrene butadiene rubber), NBR (acrylonitrile butadiene rubber), HNBR (hydrogenated NBR), CHR (epichlorohydrin rubber), ACM (acrylate rubber), and the like, and cellulose-based binders (e.g., carboxyalkylcellulose, hydroxyalkylcellulose, and combinations thereof), or any combination of at least two thereof. It is understood that water-soluble binders cannot be used in the present alkaliation process when the solvent for the present process is an aqueous solvent.

Examples of electronically conductive materials include, without limitation, carbon black (such as Ketjen™ black and Super P™), acetylene black (such as Shawinigan black and Denka™ black), graphite, graphene, carbon fibers or nanofibers (such as vapor grown carbon fibers (VGCF)), carbon nanotubes (e.g., single-walled or multi-walled), and a combination of at least two thereof.

A second step of the process comprises introducing the working electrode in an electrochemical reactor with an inert counter electrode, and a solution comprising an alkali metal salt in a solvent. The electrochemical reactor can further include a reference electrode (such as a saturated calomel electrode (SCE)). In another example, the electrochemical reactor can also be equipped with a potentiostat or rectifier for electrolysis. The electrochemical reactor is configured for continuous or batch mode electrolysis and can comprise additional components such as an agitation mode to increase mass transfer towards the working electrode and/or a temperature control device.

The solution included in the electrochemical reactor serves as electrolyte and comprises at least one salt of the alkali metal to be intercalated into the active material, for instance, a lithium, sodium, or potassium salt, preferably a lithium salt, preferably excluding halide salts. Examples of suitable salts include sulfate, carbonate, bicarbonate, hydroxide, nitrate, acetate, oxalate, or phosphate salts of the alkali metal, e.g. $A_2SO_4$ or $AHCO_3$, where A is as defined above. The solvent of the solution is an organic solvent, an aqueous solvent or a combination thereof, preferably an aqueous solvent. For example, the solvent is water (e.g., distilled or high purity water). A pH adjustment step can also be included in the process. The pH of the solution must be adapted to the electrochemically active material (and its alkaliated version), for instance, in order to maintain its stability and avoid its dissolution. For example, when the electrochemically active material to be treated is or a partially alkaliated version thereof, the pH is adjusted between 5 and 9, preferably between 6 and 7.5. For example, if the solution is too acidic, the pH can be adjusted by a hydroxide of the alkali metal. A supporting electrolyte can further be added to reduce the resistance of the electrolyte.

The counter electrode is made of a material which is inert under the electrolysis conditions, for example, platinum, a precious metal oxide, a lead oxide, and can optionally include a layer of a catalytic compound to reduce the electrode overpotential. For example, in the case of aqueous solutions, a reaction at the counter electrode can result in the release of oxygen, and dimensionally stable anodes can be used as the counter electrode material.

A third step comprises the application of a direct current between the working electrode containing the alkali metal deficient electrochemically active material and the counter electrode to obtain an alkaliated electrode comprising the alkaliated electrochemically active material (e.g., as defined in Formula II). This step can be carried out at a temperature in the range of from 5° C. to 90° C., preferably from 25° C. to 50° C.

As mentioned above, the electrochemical reactor can be operated in either continuous or batch mode. In continuous mode, the working electrode enters the electrochemical reactor from one side and follows a defined path so that the working electrode remains at a constant distance from the counter electrode while moving through an electrochemically active area of the electrochemical reactor to maintain a relatively uniform current and potential distribution. The speed at which the working electrode moves through the electrochemical reactor depends on the residence time required for the desired level of alkaliation and the applied current density. The electrochemical reactor can operate in either a controlled current density mode or a controlled voltage mode between the working electrode and the counter electrode.

According to a particular example, the electrochemically active material is $FePO_4$ or a partially delithiated $LiFePO_4$ and the current density at the working electrode is in the range of from 0.001 A/g to 100 Ng of active $LiFePO_4$, preferably in the range of from 1 to 15 Ng of active $LiFePO_4$.

Once the targeted alkaliation level is reached, the working electrode is removed from the electrochemical reactor. The electrode thus alkaliated is then preferably subjected to a washing step to remove excess electrolyte from the alkaliated electrode material followed by a drying step to remove excess washing fluids.

When present, the reference electrode can be positioned in the reactor to monitor the potential of the working electrode. Its presence will minimize parasitic reactions at the working electrode and maximize the efficiency of the alkaliation current.

In the alternative, a chemically reductive process can also be used for the alkaliation of the electrochemically active material as herein defined. This alternative alkaliation process comprises a reducing agent and further comprises a step of regenerating the reducing agent electrochemically. For instance, the electrochemically active material can be treated with a solution of the reducing agent and an alkali metal salt in a solvent. The solution can be deoxygenated prior to the addition of the reducing agent and/or electrochemically active material when they can be readily oxidized in the presence of oxygen. Similarly, this step can also be performed in the presence of a gas (such as $CO_2$, $N_2$ or Ar) allowing to eliminate the presence of oxygen. The resulting electrochemically active material and alkaliated electrochemically active material are as defined above. Preferably, the electrochemically active material is alkali metal deficient.

Non-limiting examples of alkali metal salts to be used in the chemical reduction step include alkali metal sulfates, carbonates, bicarbonates, hydroxides, nitrates, acetates, oxalates, and phosphates or any combination thereof. The solvent used is preferably an aqueous solvent.

In this process, the material to be alkaliated can be treated as a suspension in a reactor, separated from the spent reducing agent solution, rinsed and dried, and then used as active electrode material in the manufacture of electrodes. Separation of the alkaliated material from the spent reducing agent solution can be accomplished by typical physical separation methods, for instance, by filtration, centrifugation, or decantation. The separated and dried alkaliated material can then be mixed with the components needed to prepare an electrode and applied on a current collector. For example, these components can include a binder and optionally an electronically conductive material as defined above.

On the other hand, the material to be alkaliated using this process can first be mixed with the components of the electrode material defined above, and then applied on a suitable current collector to obtain an electrode such as the working electrode described in the previous process. The prepared electrode is then treated with the reducing agent solution, for example, by soaking therein, washed and dried.

In both cases, the spent reducing agent is recovered and then regenerated in a subsequent step. For instance, the solution containing the spent reducing agent is transferred to a high efficiency, high current density electrochemical (or electrolytic) cell to reduce (and thus regenerate) the spent reducing agent that can then be reused to treat an alkali metal deficient material. For instance, the reducing agent regeneration step is performed by electrochemical treatment in an electrolytic cell by passing a current between at least one cathode and at least one anode. This electrolytic cell can further comprise at least one ionic or non-ionic separator installed between the anode and the cathode to protect the regenerated reducing agent.

When the regenerated agent is prone to oxidation in the presence of oxygen, the electrolytic cell can also comprise a system for maintaining the solution deoxygenated, for instance, comprising maintaining an oxygen-free gas in the electrolytic cell, such as carbon dioxide, nitrogen or argon.

The current density of the electrolytic cell can be increased by acting on the mass transfer in the cell by well-known methods (such as the use of turbulence promoters, increasing the temperature, etc.) as well as by increasing the effective surface area of the cathode (for example, by the use of materials in the form of felts, grid, etc.). In the case where the electrolytic solution solvent is water-based, the cathode material will preferably be selected from those with a high hydrogen overpotential such as graphite, lead, etc.

Since the reducing agent can be reused nearly indefinitely, it can be considered that only electrons are used as the reducing agent of the electrode material, which can be considered as an indirect electrochemical reduction. This process thus has several advantages (economical, environmental, etc.) compared to the use of a reducing agent without its regeneration.

Various redox couples can be used as regenerable reducing agents. The selected redox couple will have a redox potential lower than that of the electrochemically active (alkali metal deficient) material to be reduced. For example, in the case of $FePO_4$ relithiation, the redox couple should have a redox potential below 3.45 V vs. Li/Li+(see A. K. Padhi, et al., J. Electrochem. Soc., 1997, 144, 1188-1194).

Another desirable characteristic for the redox couple would be a relatively high solubility, especially in its oxidized form, to avoid the formation of a precipitate in the presence of the treated electrode material. Examples of redox couples that could be used include Fe(II)/Fe(III) complexes, showing interesting properties to be used in this indirect electrochemical approach. These complexes comprise, for instance, $$[Fe(CN)_6]^{3-} / [Fe(CN)_6]^{4-},$$

$[Fe(nta)]/[Fe(nta)]^-$, $[Fe(tdpa)]^{2-}/[Fe(tdpa)]^{3-}$, $[Fe(edta)]^-/[Fe(edta)]^{2-}$, $[Fe(citrate)]/[Fe(citrate)]^-$, $[Fe(TEOA)OH]^-/[Fe(TEOA)OH]^-$, and $[Fe(oxalate)]^+/[Fe(oxalate)]$. These redox couples are particularly interesting for the alkaliation of an iron-containing electrochemically active (alkali metal deficient) material, such as $FePO_4$.

An advantage of this indirect electrochemical approach compared to direct electrochemical reduction of the electrode material is the possibility of using much higher current densities and thus increasing the productivity of the electrochemical reactor.

The electrodes prepared by the processes defined above can then be used directly for the preparation of electrochemical cells, for instance, by stacking the electrode with an active counter electrode, the two electrodes being separated by an electrolyte, such as a liquid or gel electrolyte impregnating a separator, or a solid polymer electrolyte. These electrochemical cells can further be used in the preparation of electrochemical energy storage devices.

As indicated above, the material to be alkaliated by the present processes can either be a spent electrode material obtained in a battery recycling process, or a pristine electrode material (or its precursor) to be transformed into a discharged electrode material before its assembly in the electrochemical cell.

The present description also contemplates a battery comprising at least one electrochemical cell as defined herein. For example, the battery is a lithium or lithium-ion battery. The present batteries and electrochemical cells can be used, for example, in mobile devices, such as cell phones, cameras, tablets or laptops, in electric or hybrid vehicles, or in renewable energy storage.

EXAMPLES

The following non-limiting examples are illustrative embodiments and should not be construed as further limiting the scope of the present invention. These examples will be better understood by reference to the accompanying figures.

Example 1

(a) Preparation of Delithiated $FePO_4$

An unused cathode material containing mainly $LiFePO_4$ with small amounts of PVDF and graphite was used to produce a delithiated material from $LiFePO_4$ samples using the process described in patent application US2019/0207275 (Amouzegar et al.). Ten parts of this material were dispersed in 100 parts of an aqueous solution containing $H_2O_2$ (the amount of $H_2O_2$ was adjusted for a $Fe:H_2O_2$ molar ratio of 2:1.33) in a stirred reactor in which $CO_2$ gas was bubbled under a pressure of 30 psi at room temperature. Filtered samples of the suspension taken at different intervals were analyzed by ICP to measure the concentrations of Li, Fe, and P. The solid residue from the leaching was then separated by centrifugation, washed with deionized water, and dried in an oven at 120° C. for 48 hours.

Seven batches were prepared in this manner and then combined with each other. FIG. 1 shows the leaching rates of Li, Fe and P obtained for each batch. These results were then used to calculate the leaching efficiency of each element. It was observed that after 30 minutes, nearly 80% of Li can be found in the solution and after 75 minutes this parameter reaches a value of about 90%. The leaching rates for Fe and P do not exceed 0.5% and 3%, respectively, which shows a very high selectivity and efficiency for lithium extraction.

Figure 2:
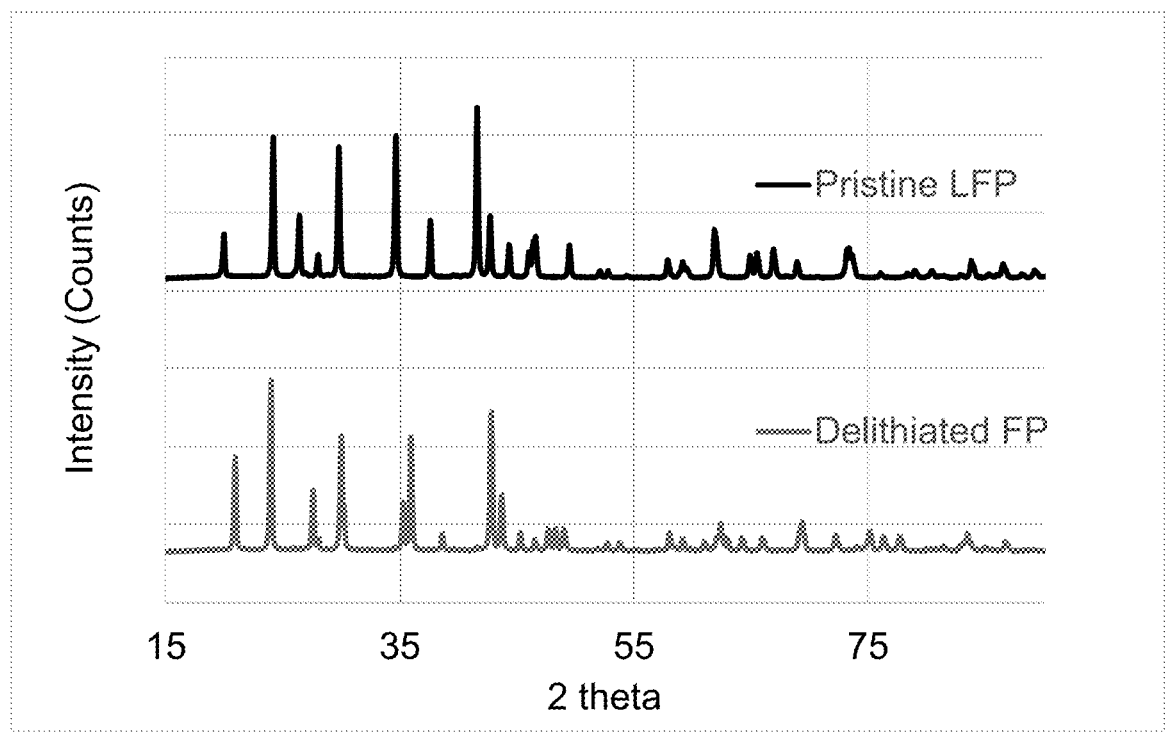
FIG. 2 displays the X-ray diffraction patterns of pristine $LiFePO_4$ (top line) and its delithiated $FePO_4$ (bottom line) according to Example 1(a).

The X-ray diffraction spectra of the solid composite sample and the pristine $LiFePO_4$ sample were obtained using a MiniFlex600™ instrument equipped with a cobalt source and are presented in FIG. 2. As it can be seen, the sample is composed mainly of $FePO_4$ with some residual $LiFePO_4$. In fact, the X-ray diffraction results confirm a higher delithiation rate than that calculated from the ICP analysis results (90% for the ICP analysis compared to 95% from the diffraction results).

(b) Preparation of $FePO_4$ Electrode

In order to characterize the electrochemical behavior of the delithiated material of 1(a) during relithiation, the $FePO_4$ powder was mixed with conductive carbons (Denka™ black and VGCF™-H, 1:1 by weight) and a binder (PVDF) in weight proportions of 87.5:7.5:5 and then dispersed in N-methyl-2-pyrrolidone (NMP) to form a suspension. This suspension is finally coated on a 4.16 $cm^2$ stainless steel collector using a doctor blade and dried (the final loading of the electrode in terms of $FePO_4$ was about 4.3 mg/$cm^2$).

(c) Relithiation of $FePO_4$ Electrode Material

Figure 3:
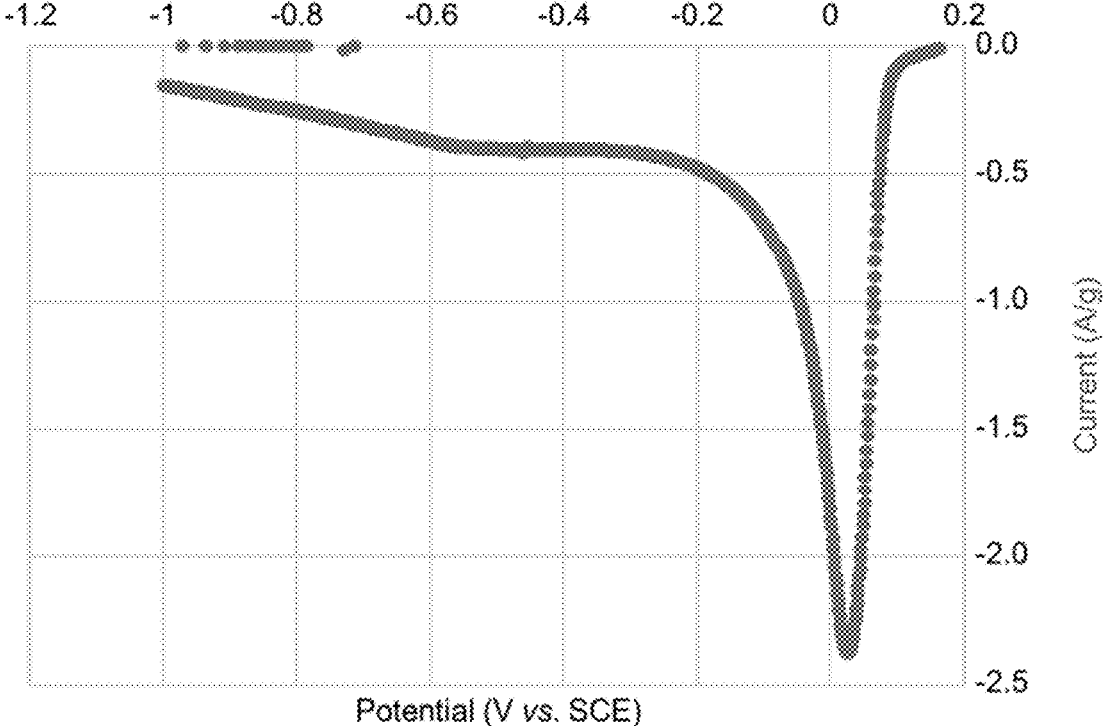
FIG. 3 presents the linear scan voltammetry of a $FePO_4$ electrode performed from 0 V vs. OCP (open circuit potential) to −1 V vs. SCE (saturated calomel electrode) at a rate of 1 mV/s as described in Example 1(c).

The electrode prepared in (b) was tested as a working electrode in a three-electrode electrochemical setup. A platinum mesh was used as a counter electrode while a saturated calomel electrode (SCE) served as a reference. The electrolyte consisted of an aqueous $Li_2SO_4$ solution (0.25 M) to which LiOH was added to adjust the pH to 7. The temperature was set at 25° C. using a double-walled glass electrochemical cell (thermostated). FIG. 3 shows current vs. potential voltammetry curves at a potential scan rate of 1 mV/s.

Figure 4:
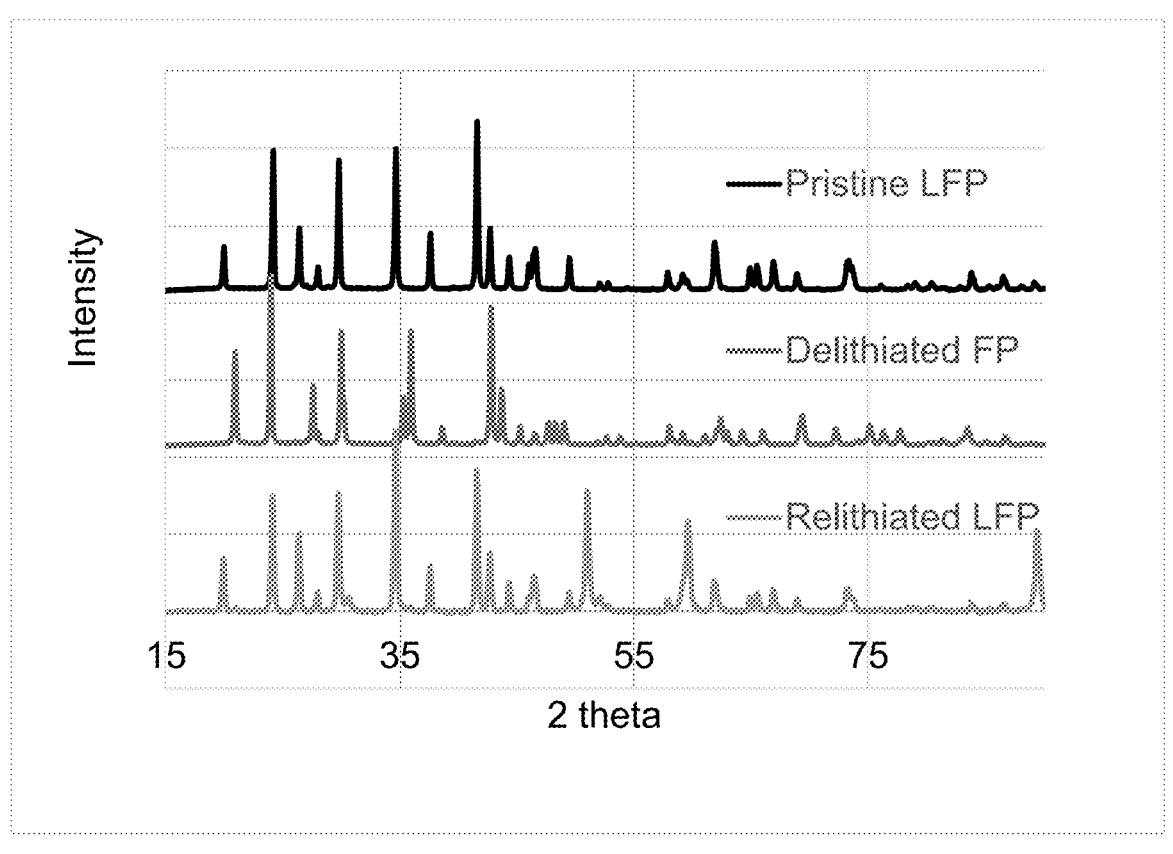
FIG. 4 shows the X-ray diffraction patterns of pristine $LiFePO_4$ (top), delithiated $FePO_4$ (middle) and relithiated $LiFePO_4$ (bottom) according to Example 1.

The working electrode was first scanned between its open circuit potential (in this case at 165 mV vs. SCE) and –1.0 V vs. SCE with a Versastat™ 4 instrument (Princeton Applied Research). It can be seen that other than the reduction peak corresponding to the lithiation of $FePO_4$ into $LiFePO_4$, no other reaction has taken place in this potential region. This means that operating the cell in this potential window would allow providing good coulombic current efficiency for the relithiation process. The X-ray diffraction pattern of the relithiated sample is compared to the pattern of a pristine $LiFePO_4$ material and that of the delithiated composite sample as shown in FIG. 4. It is clearly demonstrated that after relithiation, the structure of the delithiated sample is returned to that of the pristine material.

Example 2

In order to perform the electrochemical relithiation under conditions more suitable for a large-scale industrial operation, the same type of electrode prepared in Example 1(b) was relithiated under galvanostatic conditions by applying a constant current of 10 mA between the cathode ($FePO_4$ electrode) and the anode (inert electrode, in this case a Pt mesh). The cathode potential was measured against a SCE reference electrode in order to determine the time needed to relithiate almost all of the delithiated $FePO_4$. The electrolysis was carried out in the same type of solution as in Example 1(c) and at the same temperature (25° C.).

Figure 5:
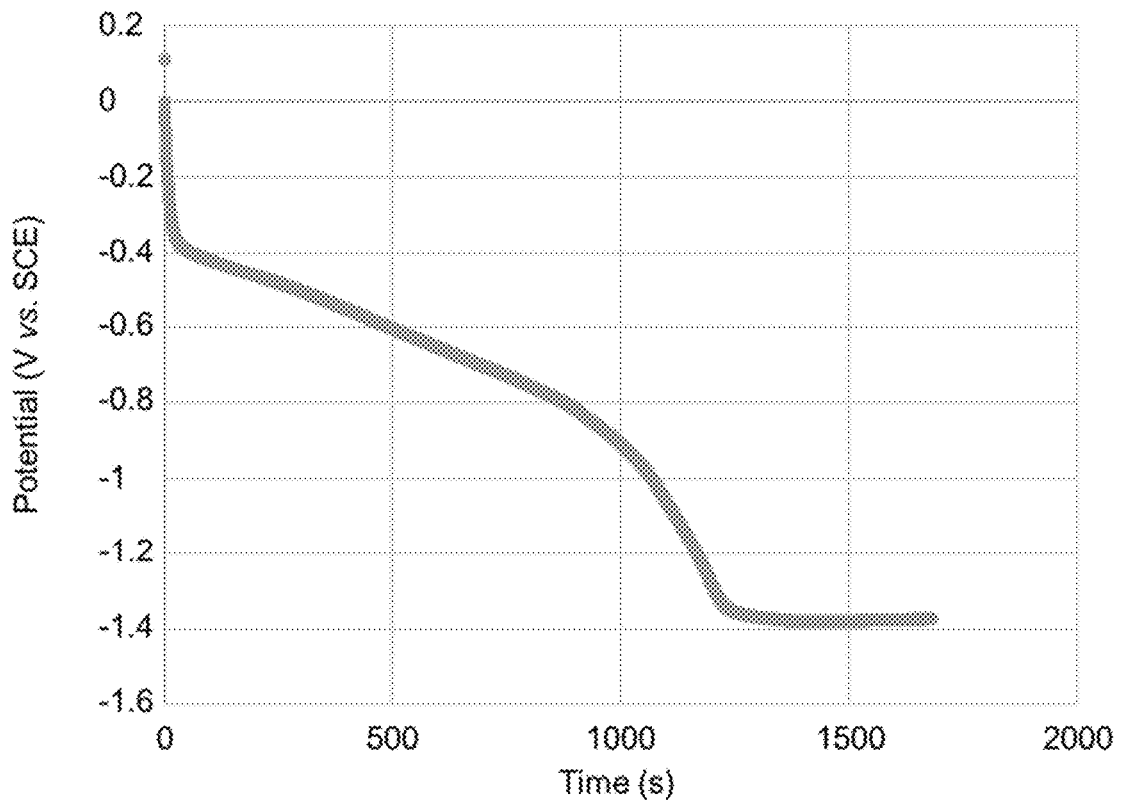
FIG. 5 shows a voltammogram of the galvanostatic relithiation of a $FePO_4$ electrode performed at 10 mA according to Example 2.

The variation in cathode potential as a function of electrolysis time is presented in FIG. 5. The initial cathode potential was about 0 V vs. SCE and gradually shifted to more cathodic potentials as a function of time as the degree of lithiation of the cathode material increased. After about 1200 seconds, the electrode potential stabilises and remains constant at –1.4 V vs. SCE indicating the start of a new electrochemical reaction, which includes hydrogen evolution.

Figure 6:
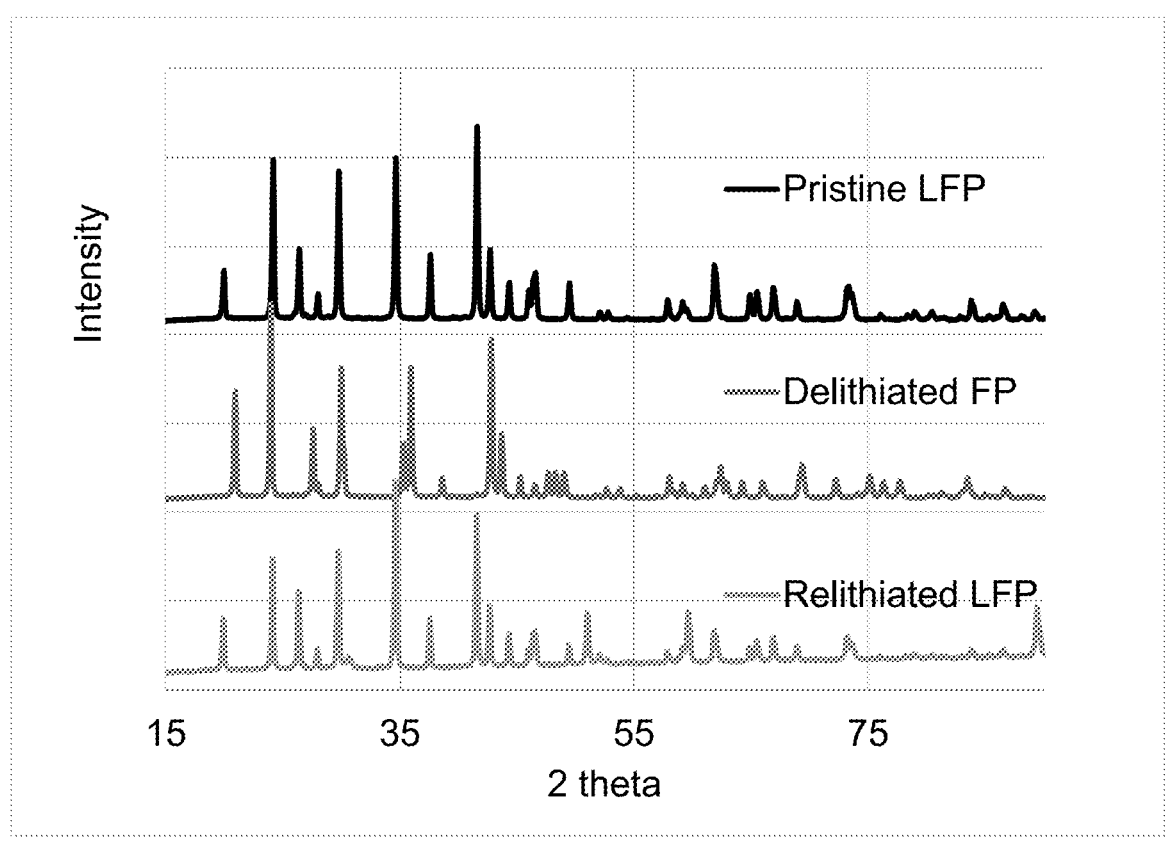
FIG. 6 presents the X-ray diffraction patterns of pristine $LiFePO_4$ (top), delithiated $FePO_4$ (middle) and relithiated $LiFePO_4$ (bottom) according to Example 2.

The X-ray diffraction analysis of the electrode presented in FIG. 6, confirmed the very high degree of reconstitution of $FePO_4$ in lithium ions leading to a transformation rate into $LiFePO_4$ phase close to 100%. Indeed, the $FePO_4$ peaks are clearly transmuted into $LiFePO_4$ peaks. Other phases represented in the diffractograms include the stainless-steel support (2θ: 51, 54, and 90) and the conducting graphite (2θ: 30).

The coulombic efficiency of the relithiation was calculated to be more than 80%, thus confirming the predicted electrochemical behavior presented in Example 1, i.e., under certain conditions of current density at the cathode, it is possible to minimize side reactions (such as hydrogen evolution) in order to achieve high current efficiency.

Example 3

To evaluate the effect of temperature on the lithiation process, two electrodes prepared as in Example 1(b) were relithiated at temperatures of 25° C. and 50° C. respectively in an aqueous solution of $Li_2SO_4$ (0.5 M) to which LiOH was added to adjust the pH to 7. The relithiation was carried out at a constant potential of –0.2 V vs. SCE.

Figure 7:
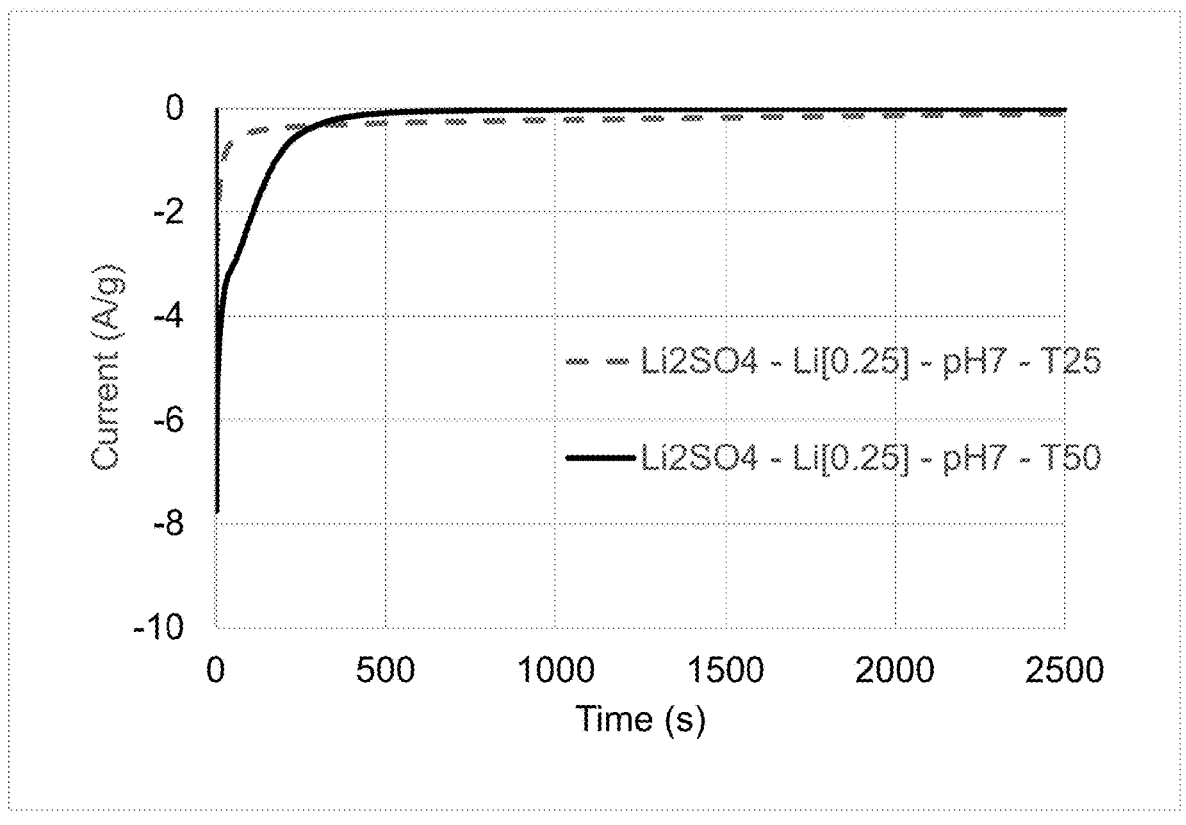
FIG. 7 presents the galvanic response of two $FePO_4$ electrodes subjected to potentiostatic relithiation at −0.2 V vs. SCE at 25° C. (dashed line) and 50° C. (solid line) according to Example 3.

The current variation between the cathode and anode as a function of time is presented in FIG. 7. The higher rate of electrochemical relithiation at higher temperature (50° C.) results in a less pronounced current decrease at the beginning of the process as well as a shorter time to reach a practically zero current between the cathode and the anode (point of nearly complete relithiation) compared to the relithiation carried out at 25° C.

Figure 8:
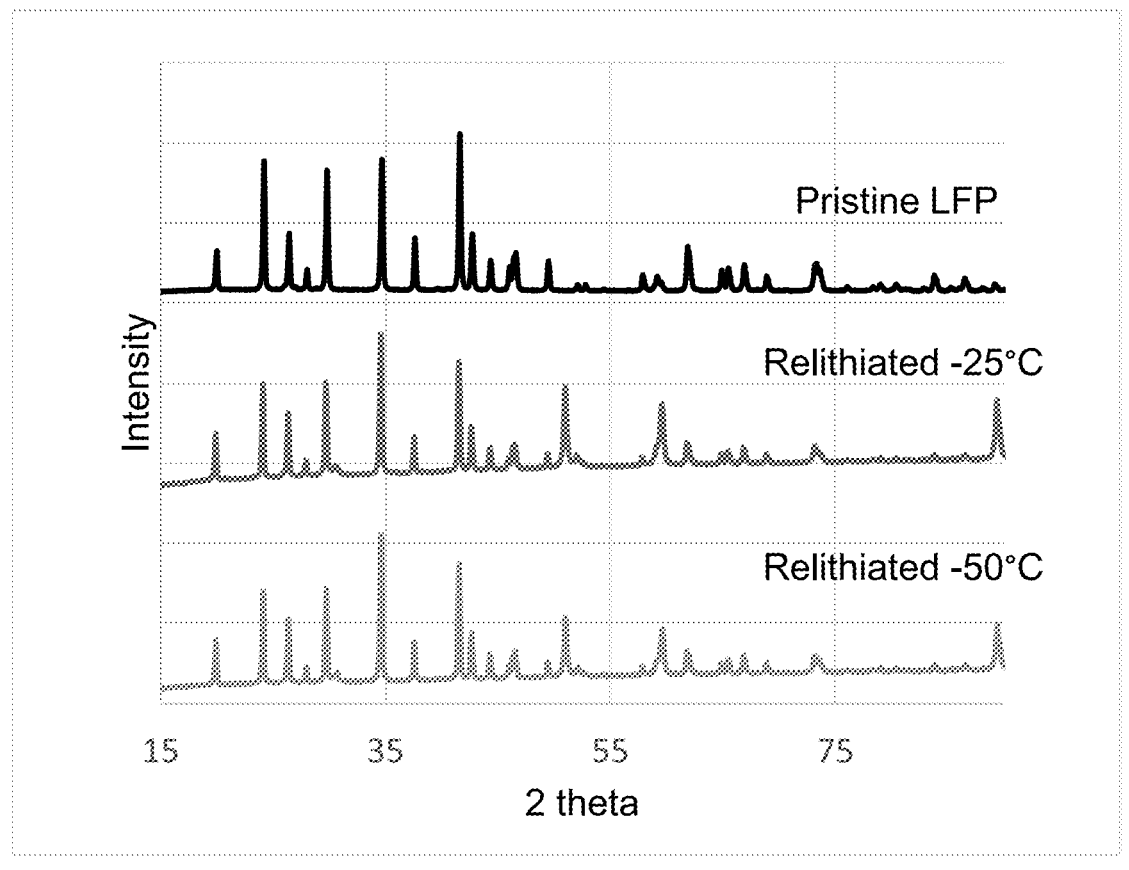
FIG. 8 presents the X-ray diffraction patterns of pristine $LiFePO_4$ (top), $LiFePO_4$ relithiated at 25° C. (middle) and $LiFePO_4$ relithiated at 50° C. (bottom) according to Example 3.

The X-ray diffractograms in FIG. 8 confirm that both electrodes are highly relithiated with less than 8% and no detectable residual $FePO_4$ for the tests at 25° C. and at 50° C., respectively.

Example 4

To demonstrate the feasibility of directly using a $LiHCO_3$ solution produced during the processing of an electrode material from spent batteries as described in published patent application US2019/0207275 (Amouzegar et al.), an electrode similar to that described in Example 1(b) was relithitiated in an electrochemical cell using a 0.5 M $LiHCO_3$ aqueous solution (produced by bubbling $CO_2$ into a suspension of $Li_2CO_3$ in water at 30 psi and room temperature). The cell was maintained under $CO_2$ by gently bubbling $CO_2$ gas into the electrolyte at pH 7 and 25° C.

Figure 9:
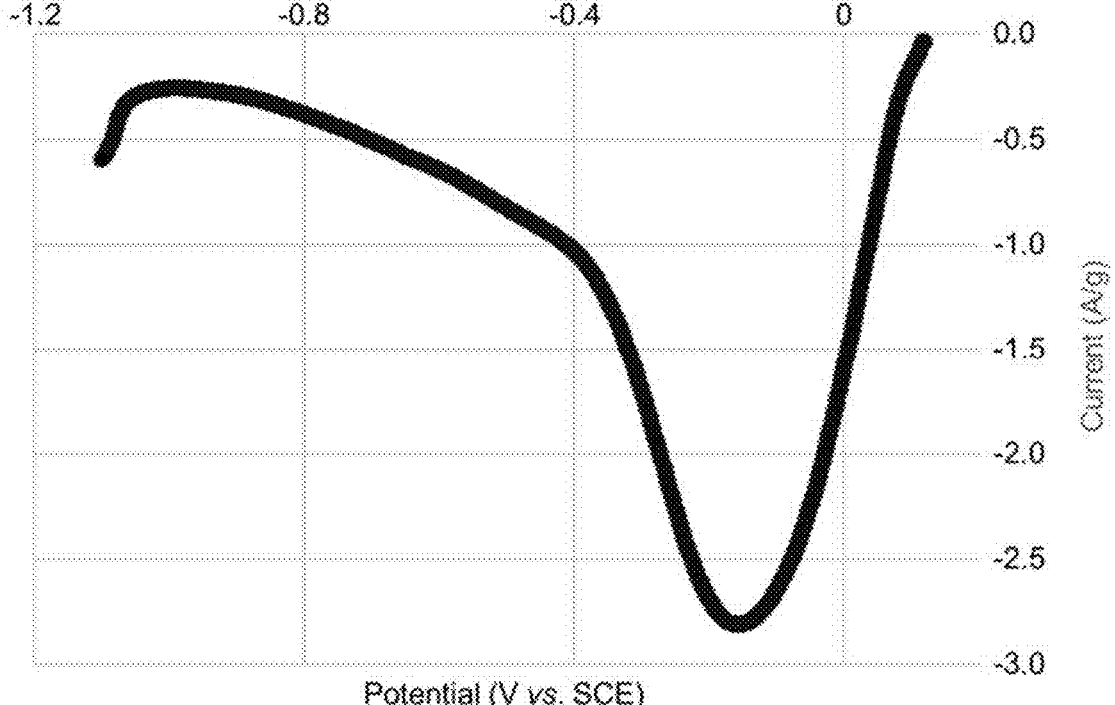
FIG. 9 presents the cathodic linear scan voltammetry of an $FePO_4$ electrode performed at a flow rate of 1 mV/s between 0 V vs. OCP and −1.1 V vs. SCE in a 0.5 M $LiHCO_3$ aqueous solution according to Example 4.
Figure 10:
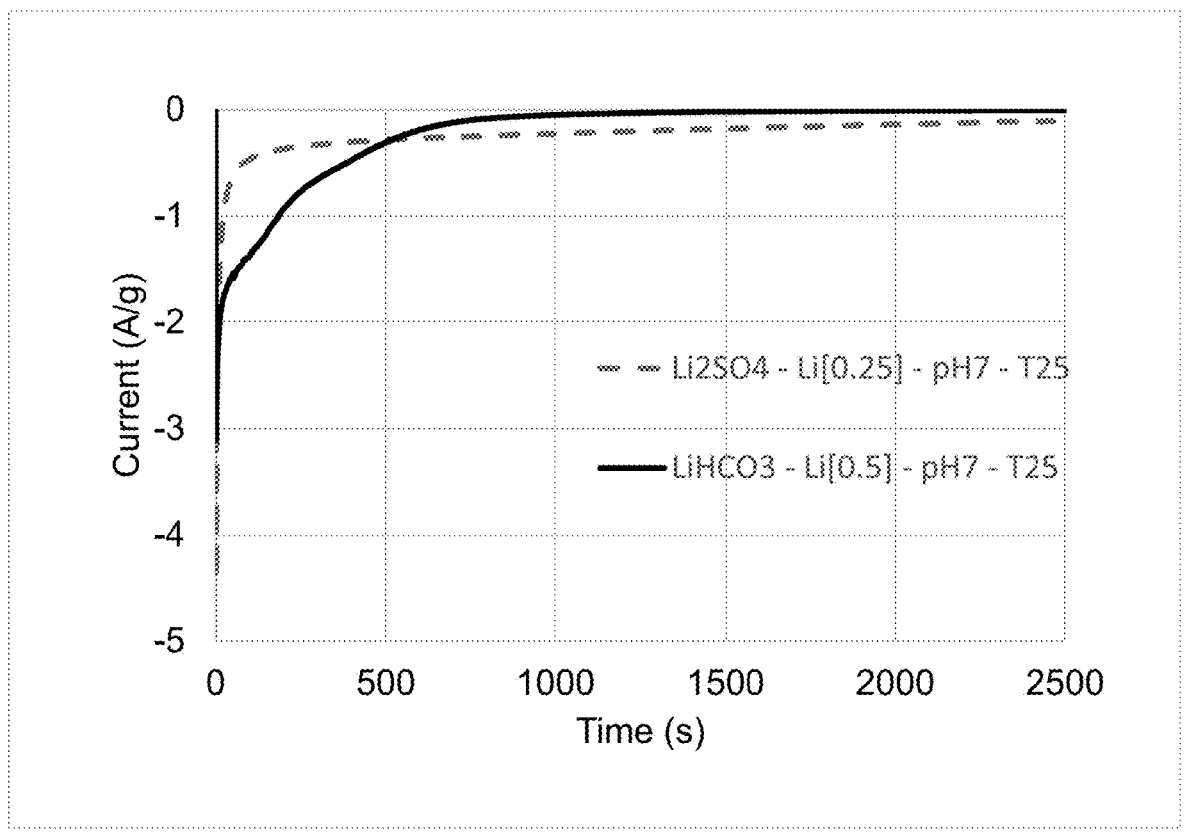
FIG. 10 presents the galvanic response of two $FePO_4$ electrodes subjected to potentiostatic relithiation at −0.2 V vs. SCE at 25° C. in 0.25 M $Li_2SO_4$ (dashed line) and 0.5 M $LiHCO_3$ (solid line) according to Example 4.
Figure 11:
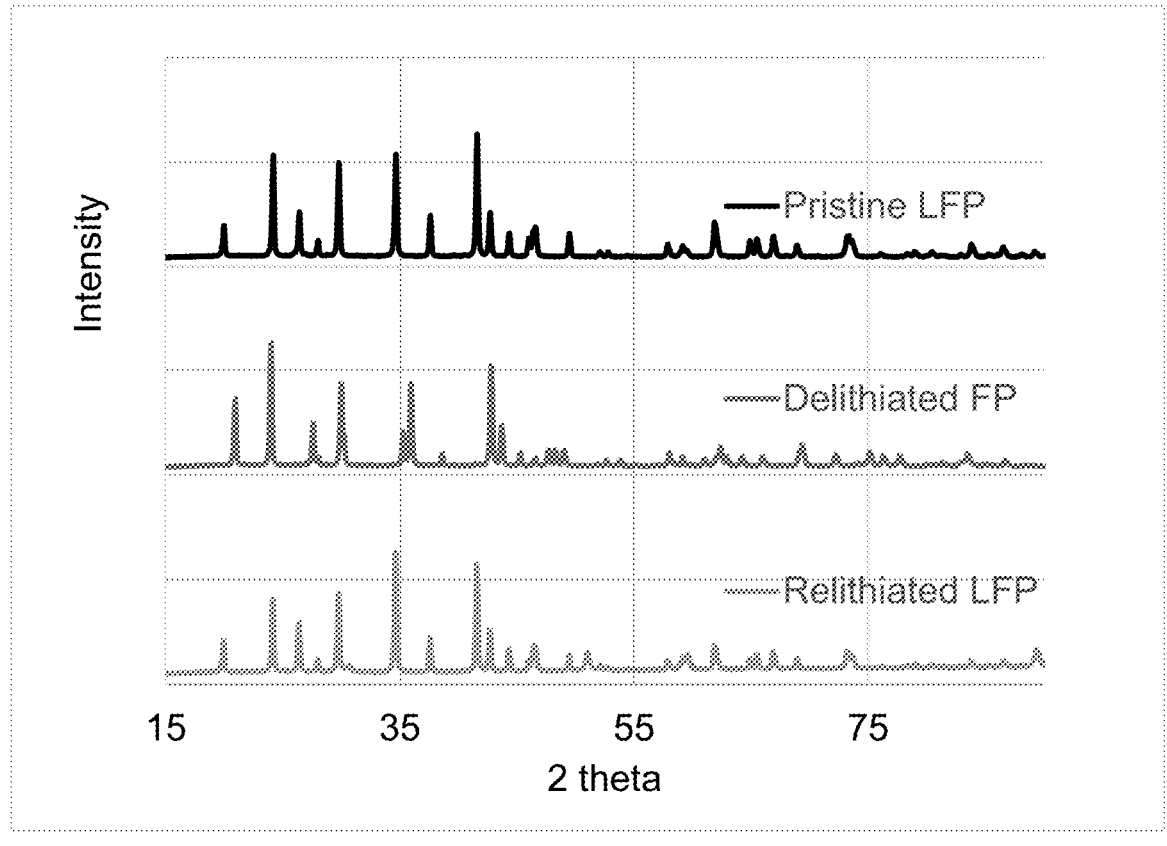
FIG. 11 presents the X-ray diffraction patterns of pristine $LiFePO_4$ (top), delithiated $FePO_4$ (middle) and relithiated $LiFePO_4$ (bottom) according to Example 4.

The cathodic linear scan voltammetry of the electrode performed at a 1 mV/s rate between 0 V vs. OCP (open circuit potential) and –1.1 V vs. SCE is shown in FIG. 9. The same type of relithiation reduction peak as the one observed in Example 1 using a $Li_2SO_4$ solution is observed, thereby indicating the possibility of using a $LiHCO_3$ solution as a source of Li ions during the relithiation process. In fact, relithiation in a bicarbonate-based electrolyte seems to show better kinetics compared to the sulfate-based electrolyte under similar conditions as shown in FIG. 10. Compositional analysis by X-ray diffraction also shows complete relithiation of the electrode (see FIG. 11).

Example 5

(a) Preparation of $FePO_4$ Electrode

To show that the same approach is readily applicable using an industrial current collector used in commercial batteries, the same type of electrode prepared in Example 1(b) was prepared using a 15 μm thick aluminum current collector coated with a thin carbon layer. The dried iron phosphate powder was mixed with conductive carbons (Denka™ black and VGCF™-H, 1:1 by weight) and a PVDF binder in a weight ratio of 89:6:5 and dispersed in N-methyl-2-pyrrolidone (NMP). The suspension thus obtained was coated on an aluminum current collector and dried in an oven. The electrode loading was determined to be about 7.12 mg of $FePO_4/cm^2$.

(b) Relithiation of $FePO_4$ Electrode Material

Figure 12:
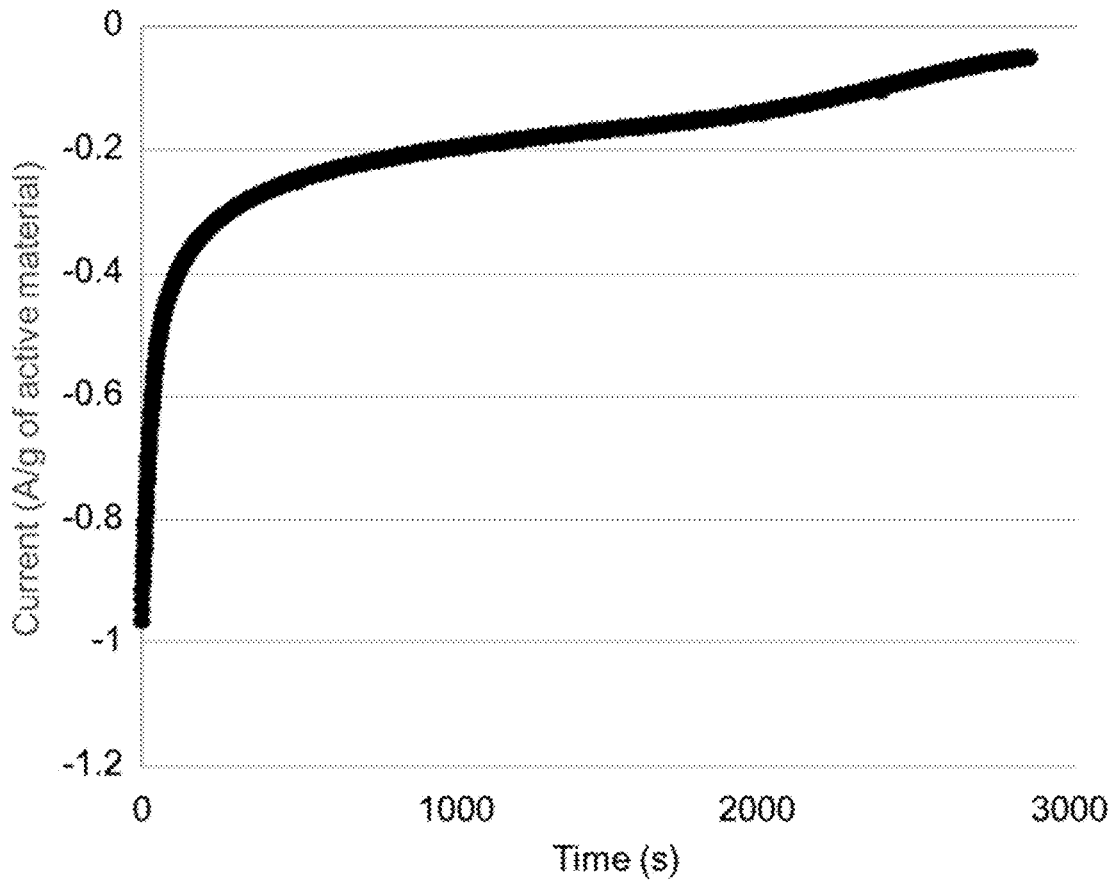
FIG. 12 shows the variation in current as a function time for an electrode material applied on an aluminum current collector according to the process of Example 5.

In order to simulate an electrochemical setup operating in batch mode, a strip of the electrode prepared in (a) with a surface area of 37.5 $cm^2$ was installed in an electrochemical cell (using an SS support to maintain a constant distance from the counter electrode) in which a 90 $cm^2$ platinum mesh and an SCE electrode were installed as the counter electrode and the reference electrode, respectively. The electrolyte was made of $Li_2SO_4$ (0.5 M), and the pH was adjusted to 9 using diluted LiOH. The cathode potential was controlled at –200 mV against SCE with a potentiostat from Princeton Applied Research. The electrolysis was carried out under agitation and at a temperature of 25° C. FIG. 12 shows the variation of current as a function of time. The electrolysis was stopped once the current had decreased by 95% (in this case after 2860 seconds) and the working electrode was washed with deionized water and dried.

Figure 13:
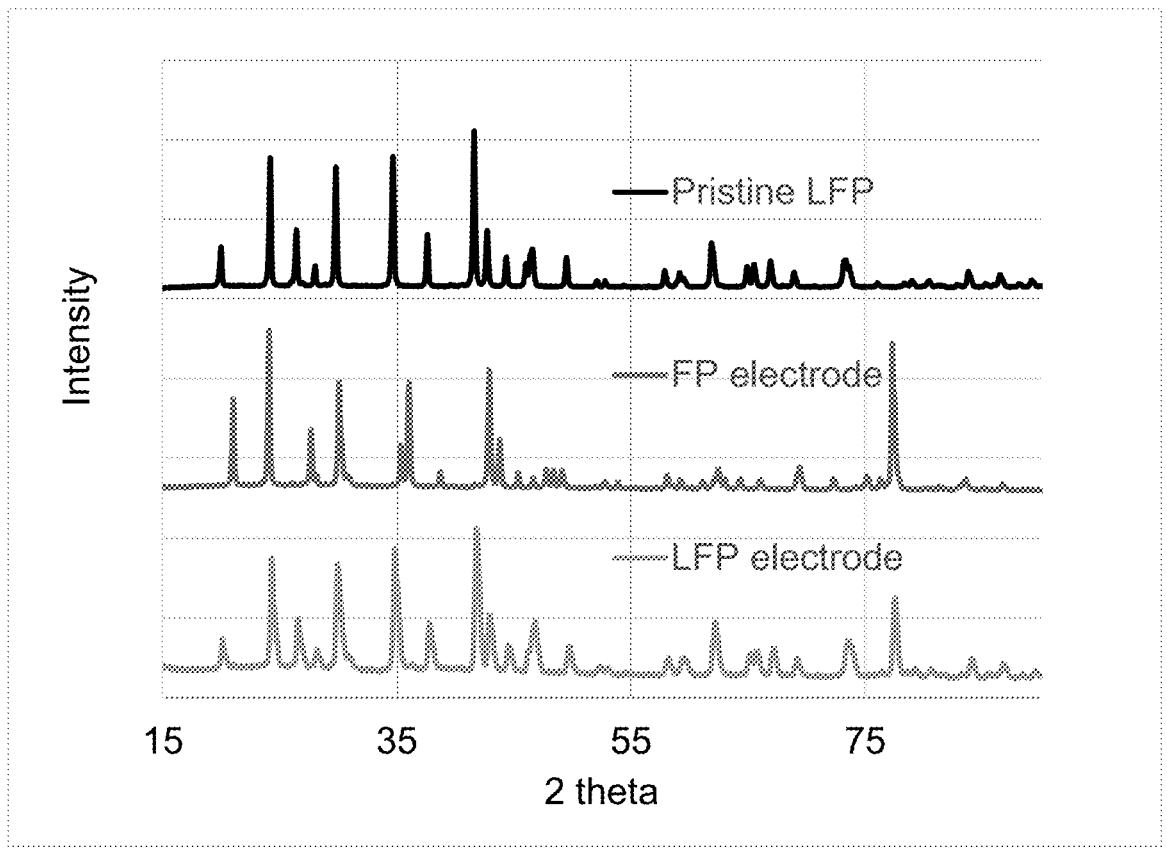
FIG. 13 presents the X-ray diffraction patterns of pristine $LiFePO_4$ (top), delithiated $FePO_4$ (middle) and relithiated $LiFePO_4$ (bottom) electrode materials according to Example 5.

The comparison of the X-ray diffractograms (FIG. 13) obtained from pristine $LiFePO_4$, delithiated $FePO_4$ and relithiated $LiFePO_4$ confirmed that the relithiation process had worked. Indeed, the relithiated electrode was composed of 93% $LiFePO_4$ and 7% $FePO_4$. The relithiated $LiFePO_4$ shows an orthorhombic structure similar to that of pristine $LiFePO_4$.

(c) Use of a Relithiated $LiFePO_4$ Electrode in a Coin Cell

The electrochemical properties of the electrode relithiated in (b) and a commercial $LiFePO_4$ material applied in the same manner on an aluminum current collector were tested against metallic lithium in coin cells. The active material loadings calculated in mg of $LiFePO_4$ per unit area were 7.32 mg of $LiFePO_4/cm^2$ and 5.88 mg of $LiFePO_4/cm^2$ respectively for the relithiated and pristine $LiFePO_4$ samples. Both cells were cycled in duplicate between 2 V and 3.8 V at a discharge rate of 1C and a charge rate of C/4. A pre-charge/discharge cycle at C/24 was applied to each coin cell prior to the cycling procedure. In addition, the cycling procedure involved an initial discharge at C/12, which was repeated every 20 cycles in order to monitor the state-of-health of the battery.

Figure 14:
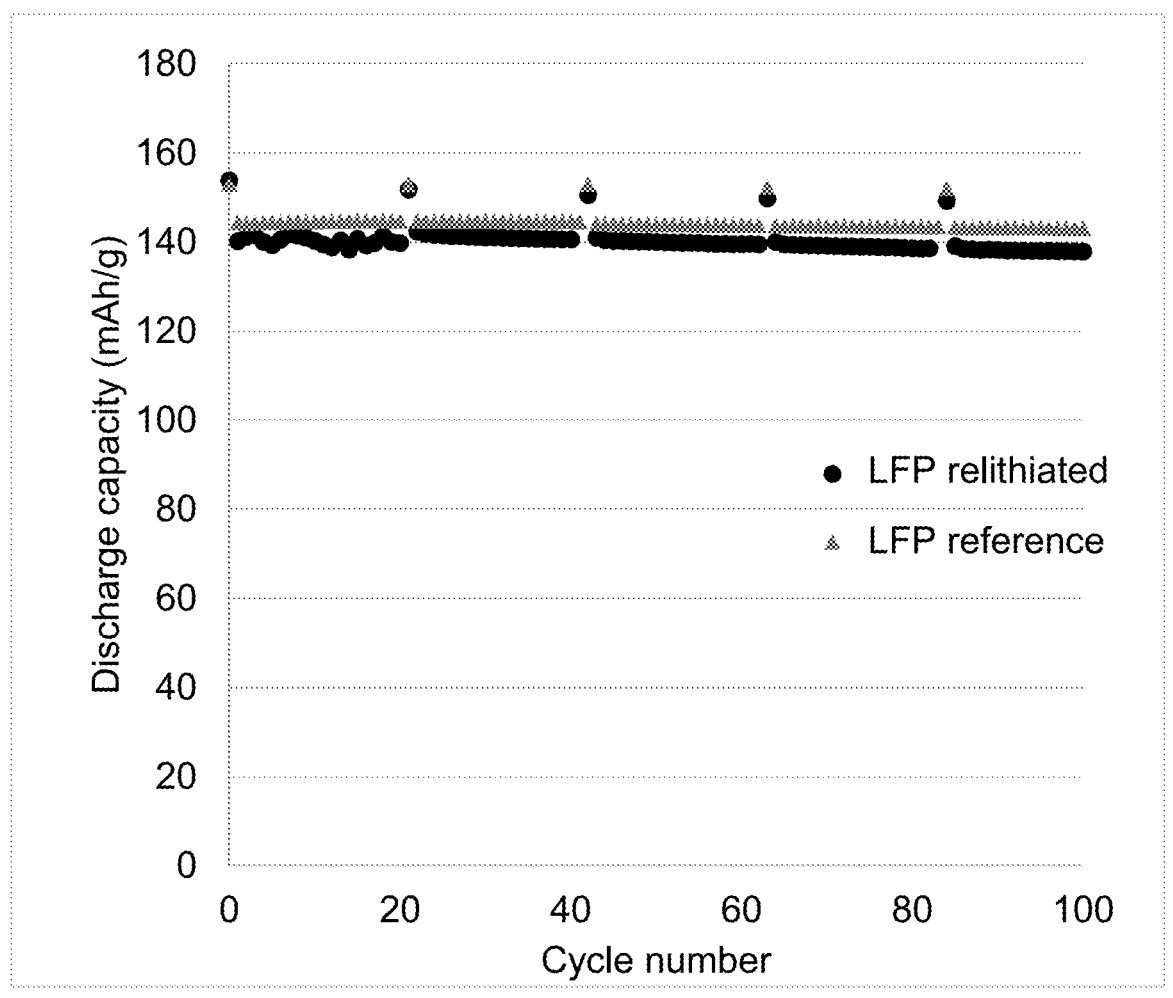
FIG. 14 shows the discharge capacity of relithiated $LiFePO_4$ (circles) compared to the reference $LiFePO_4$ (triangles) according to Example 5.

FIG. 14 shows the discharge capacity curves for these electrode materials. It can be seen that both electrode materials present very good stabilities in terms of capacities (less than 2% loss after 100 cycles). After 100 cycles, the electrochemically relithiated and the reference $LiFePO_4$ materials presented good and quite similar discharge capacities of respectively 138 and 143 mAh/g at a discharge rate of 1C. The very small difference in capacity may be related to the slight difference in active material loading, i.e., the slightly higher loading for the electrochemically relithiated material may result in a slightly lower capacity.

Example 6

(a) Preparation of Fe(II)/Fe(III) Redox Couple Solutions i. Preparation of Fe(II) and Fe(III) Citrate Solutions A citric acid solution was prepared by dissolving 3.18 parts of the acid in 200 parts of water. The solution was then alkalized to a pH of 6 using a 4 M LiOH solution. The lithium concentration was adjusted to a minimum of 0.5 M before adjusting the volume to 250 parts by adding the necessary amount of $Li_2SO_4$.

Then, to prepare the ferrous solution, 0.56 parts of hydrated ferrous sulfate salt ($FeSO4·7H_2O$) was dissolved in 100 parts of the previously prepared citric acid solution.

Similarly, for the ferric solution, 0.21 parts of hydrated ferric sulfate ($Fe_2(SO_4)_3·xH_2O$) was dissolved in 100 parts of the citric acid solution prepared above.

Each solution was filtered at 0.22 μm and then deoxygenated by argon injection before their subsequent use. If necessary, the pH of each solution was adjusted to values between 4.5 and 8 using LiOH or $H_2SO_4$.

ii. Preparation of Fe(II) and Fe(III) EDTA Solutions

An EDTA solution was prepared by dissolving 14.6 parts of the salt in its acid form in 100 parts of a 1 M LiOH solution. The solution was then alkalized to a pH of 6 using a 4 M LiOH solution. The lithium concentration was adjusted to a minimum of 0.5 M before adjusting the volume to 250 parts by adding the necessary amount of $Li_2SO_4$.

Then, to prepare the ferrous solution, 2.78 parts of hydrated ferrous sulfate salt ($FeSO4·7H_2O$) were dissolved in 100 parts of the previously prepared EDTA solution.

Similarly, for the ferric solution, 1 part of hydrated ferric sulfate ($Fe_2(SO_4)_3·xH_2O$) was dissolved in 100 parts of the previously prepared EDTA solution.

Each solution was filtered at 0.22 µm and then deoxygenated by argon injection before their subsequent use. If necessary, the pH of each solution was adjusted to values between 4.5 and 8 using LiOH or $H_2SO_4$.

(b) Studies of the Electrochemical Characteristics of Fe(11)/Fe(III) Redox Couples In order to confirm the feasibility of reducing $FePO_4$ to $LiFePO_4$ by each of the redox couples prepared in section (a) of this example, the electrochemical behavior of the Fe(III) solution of each iron complex was studied in a three-electrode electrochemical setup.

Each of the Fe(III) solutions were placed in the cathode compartment of the cell (under an argon blanket) in which a glassy carbon disk (3 mm diameter) was installed as the working electrode. A Pt mesh was placed in the electrolyte-filled anode compartment separated by a sintered glass disk. An Ag/AgCl electrode was used as the reference electrode.

Figure 15:
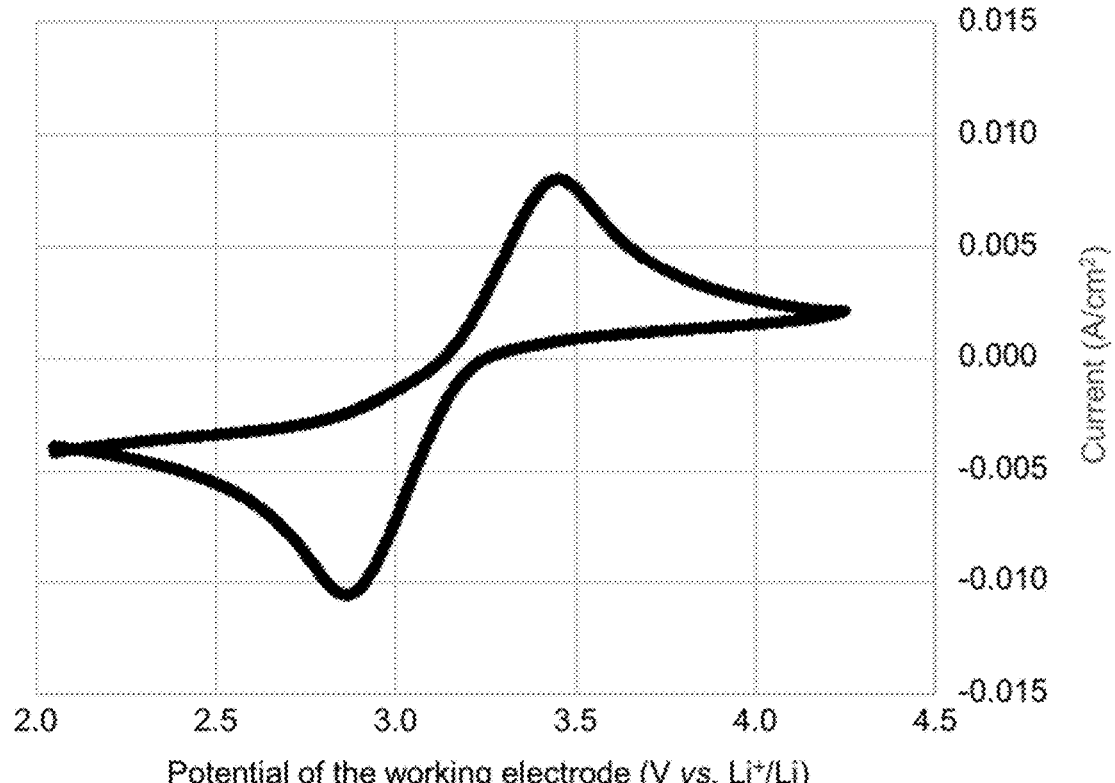
FIG. 15 shows a voltammogram of the Fe(III)-EDTA solution performed between 2.05 V and 4.25 V vs. Li+/Li at a scan rate of 200 mV/sec according to Example 6(b).

Voltammograms were obtained using a Versastat™ 4 potentiostat (Princeton Applied Research). FIG. 15 shows the voltammogram for the Fe(III)-EDTA solution carried out at a pH of 4.5 between 2.05 V and 4.25 V vs. $Li^+/Li^0$ at a scan rate of 200 mV/sec. A large separation of values (of the order of 650 mV) can be observed for the oxidation peaks of Fe(II)-EDTA and the reduction of Fe(III)-EDTA, which is an indicator of a relatively slow kinetics. However, it can be seen that the oxidation of Fe(II)-EDTA starts at a potential of about 3.16 V vs. $Li^+/Li$ which is significantly more negative compared to the required minimum potential of 3.45 V vs. $Li^+/Li$ for the reduction of $FePO_4$ to $LiFePO_4$.

Table 1 shows the potential values at which an oxidation current is observed for each prepared Fe(II)-based reducing agent.

TABLE 1

Oxidation potentials

| Reducing agent | Starting oxidation potential (V vs. $Li^+/Li$) |
| --- | --- |
| Fe(II)-citrate | 3.39 |
| Fe(II)-EDTA | 3.16 |

Figure 16:
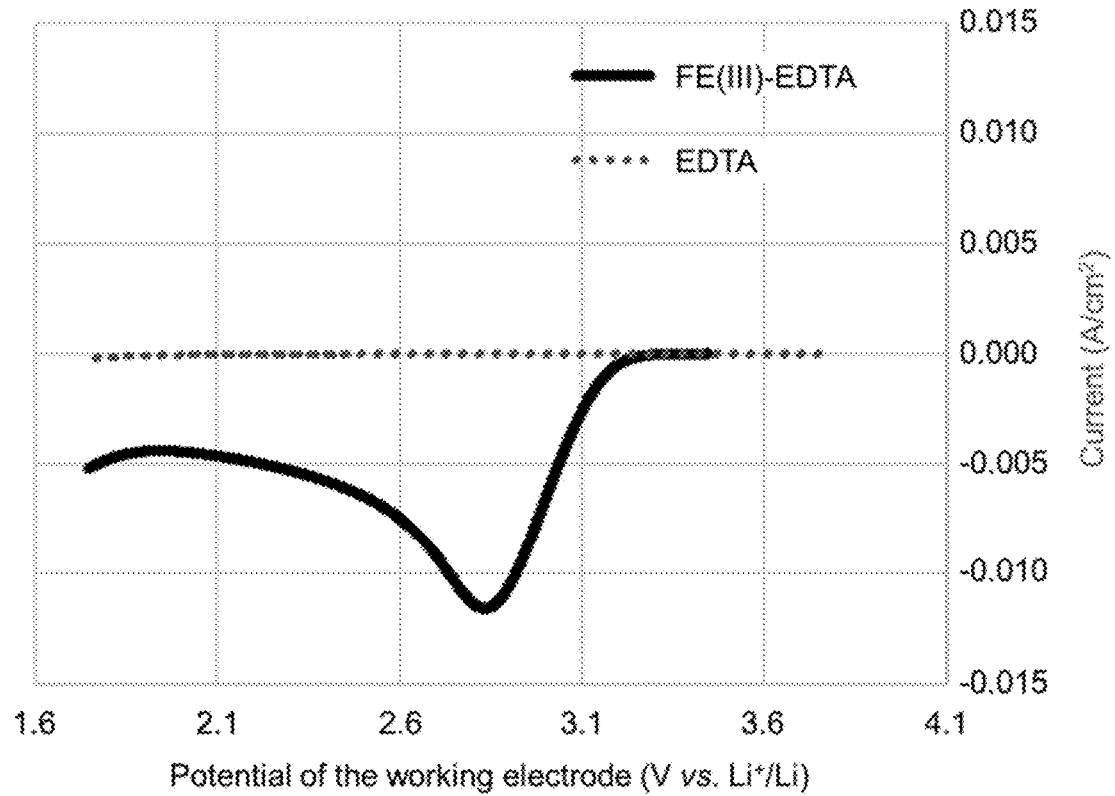
FIG. 16 presents the polarization curves in the case of a solution of EDTA-LiOH (dashed line) and of Fe(III)-EDTA in LiOH (solid line) according to Example 6(b).

FIG. 16 shows the polarization curves in the case of a solution of EDTA-LiOH and Fe(III)-EDTA in LiOH. It can be observed that the reduction peak of Fe(III)-EDTA appears at less negative potentials than the hydrogen evolution reaction in this medium, which demonstrates the possibility of carrying out the electrochemical regeneration of Fe(II)-EDTA from Fe(III)-EDTA at reasonable coulombic efficiencies while minimizing the current related to hydrogen formation.

Example 7

(a) Relithiation of $FePO_4$ by Fe(II)-EDTA

In order to demonstrate the use of Fe(II)-EDTA for the relithiation of $FePO_4$, 50 mL of the solution prepared according to a protocol similar to that described in Example 6 was brought into contact with 0.65 g of the $FePO_4$ prepared in Example 1(a) under an argon atmosphere and at 40° C. For this assay, the EDTA concentration was increased to meet an EDTA/Fe(II) molar ratio of 4 and the pH was adjusted to 8 with a 1 M LiOH solution to maximize the solubility of the redox couple. The $FePO_4$ powder was kept in suspension using a magnetic stirrer and the decrease in concentration of Fe(II)-EDTA and appearance of Fe(III)-EDTA were monitored using an ORP sensor placed in the suspension.

Figure 17:
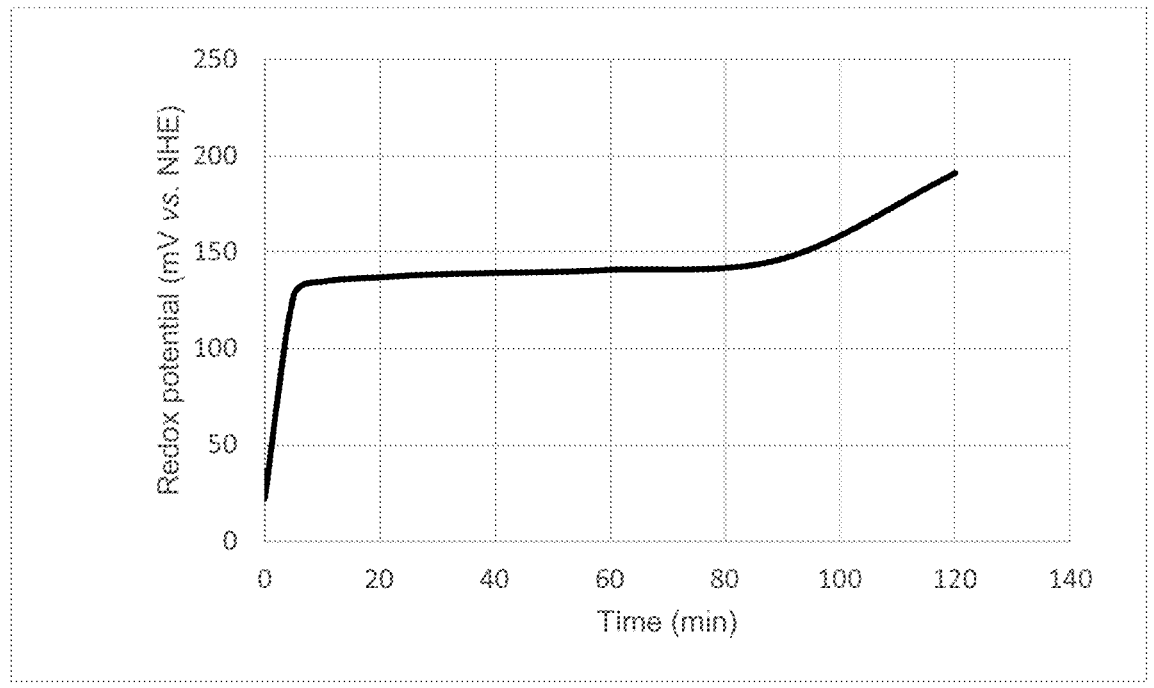
FIG. 17 shows the variation of the redox potential of the suspension during the reduction of $FePO_4$ by Fe(II)-EDTA according to Example 7(a).

FIG. 17 shows the variation in potential of the suspension during relithiation. An increase in potential can be observed as Fe(II)-EDTA is oxidized (by reducing $FePO_4$ to $LiFePO_4$) to Fe(III)-EDTA.

Figure 18:
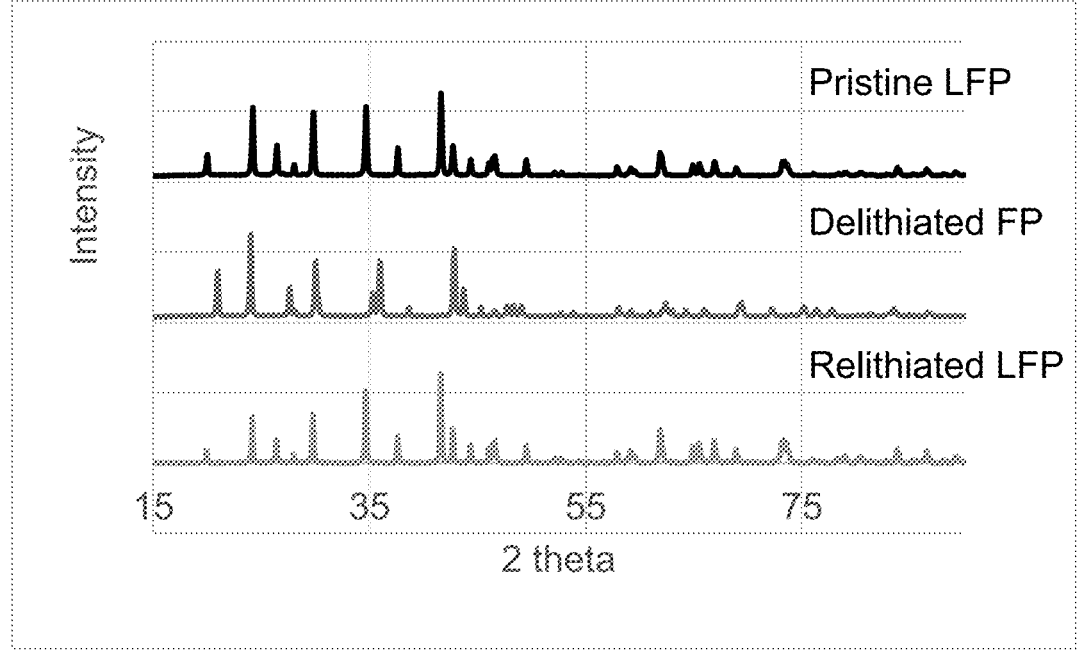
FIG. 18 presents the X-ray diffraction patterns of pristine $LiFePO_4$ (top), delithiated $LiFePO_4$ (middle) and relithiated $LiFePO_4$ (bottom) according to Example 7(a).

At the end of the assay, the solid was separated by vacuum filtration, washed, dried and analyzed by X-ray diffraction (Rigaku MiniFlex™ 600). Comparison of the diagrams of pristine $LiFePO_4$, delithiated $FePO_4$ and the solid obtained after contact with the Fe(II)-EDTA solution and in the presence of the lithium salt (FIG. 18) shows that the solid treated with the Fe(II)-EDTA solution was completely relithiated to form $LiFePO_4$.

(b) Relithiation of $FePO_4$ by Fe(II)-Citrate

Figure 19:
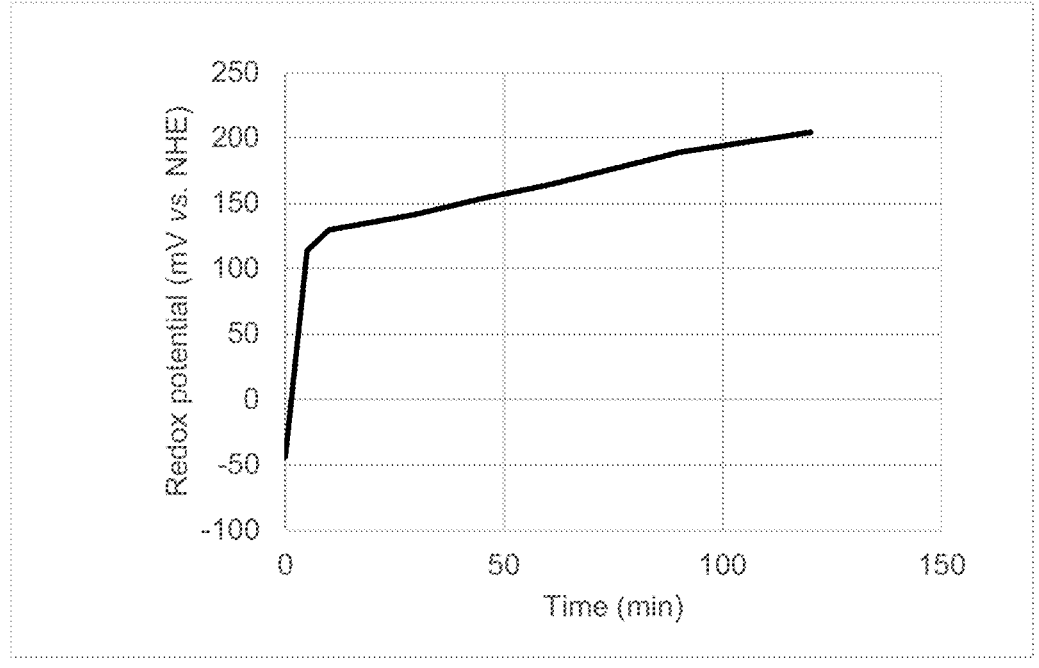
FIG. 19 shows the variation of the redox potential of the suspension during the reduction of $FePO_4$ by Fe(II)-citrate according to Example 7(b).

A relithiation assay was performed using the Fe(II)-citrate solution similarly to the procedure presented for Fe(II)-EDTA in Section 7(a). In the present example, the citrate/Fe(II) ratio was adjusted to 2 by the addition of ferrous sulfate and the pH was adjusted to 6 by the addition of 1 M LiOH. 50 mL of the solution were brought into contact with 0.19 g of the $FePO_4$ prepared in Example 1(a) under an argon atmosphere and at 40° C. The $FePO_4$ powder was kept in suspension using a magnetic stirrer and the decrease in the concentration of Fe(II)-citrate and the appearance of Fe(III)-citrate were monitored using an ORP sensor placed in the suspension (FIG. 19).

Figure 20:
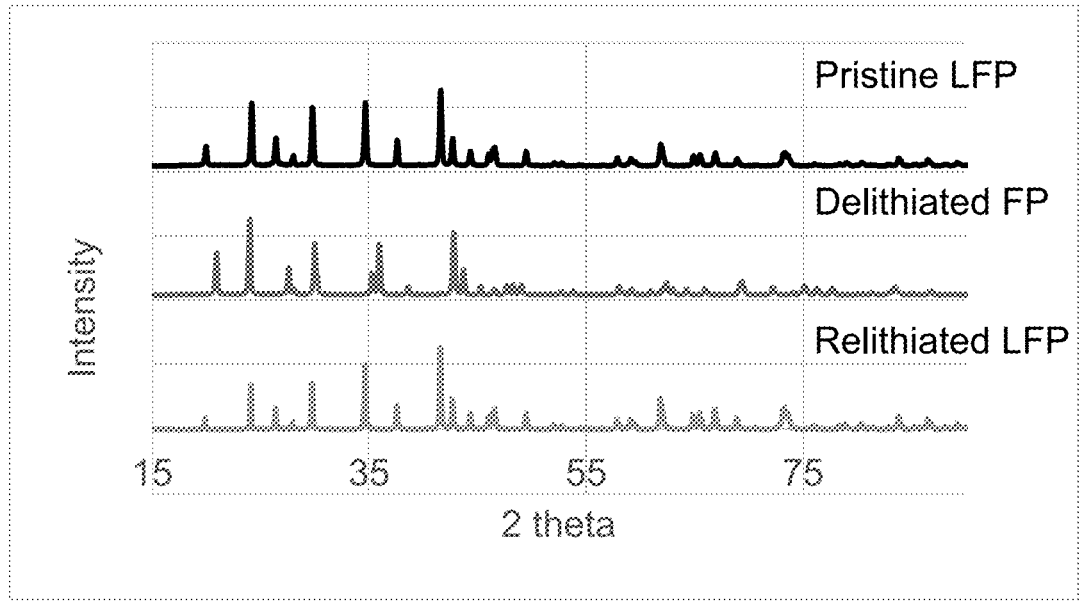
FIG. 20 presents the X-ray diffraction patterns of pristine $LiFePO_4$ (top), delithiated $LiFePO_4$ (middle) and relithiated $LiFePO_4$ (bottom) according to Example 7(b).

At the end of the assay, the solid was separated by vacuum filtration, washed, dried and analyzed by X-ray diffraction. As in the case of the solid of Example 7(a), comparison of the diffractograms of pristine $LiFePO_4$, delithiated $FePO_4$, and the solid obtained after contact with the Fe(II)-citrate solution and in the presence of the lithium salt (FIG. 20) shows that the $FePO_4$ was completely relithiated to form $LiFePO_4$.

Example 8

(a) Electrochemical Regeneration of Fe(III)-EDTA in Fe(II)-EDTA

A volume of 800 mL of an Fe(III)-EDTA solution having an initial Fe(III), $Li_2SO_4$, and EDTA concentration of 0.08 M, 1 M, and 0.2 M, respectively, and whose pH had been adjusted to 6.3 with LiOH was placed in the catholyte reservoir of an ICI-FM01 filter-press electrolysis cell assembly and under the protection of an inert gas (Ar). The FM01 cell was assembled with a graphite cathode, a titanium anode coated with an iridium oxide layer and a Nafion™ 324 type cationic membrane. The geometric active surface of all components (cathode, anode and membrane) was 64 $cm^2$.

The catholyte and anolyte flow rate was 2 liters/min with a linear catholyte velocity of about 16 cm/s. The electrolysis temperature was controlled at about 50° C. by recirculating a heat transfer fluid heated by a thermostatic bath (Poly-Science #PDO7R-20-A11B) through heat exchangers installed in the anolyte and catholyte tanks. The electrolysis was performed by setting the voltage between the anode and the cathode at 1.65 V (Instek #SPS-1230). An ORP sensor was placed in the catholyte reservoir to monitor the evolution of potential of the solution.

Figure 21:
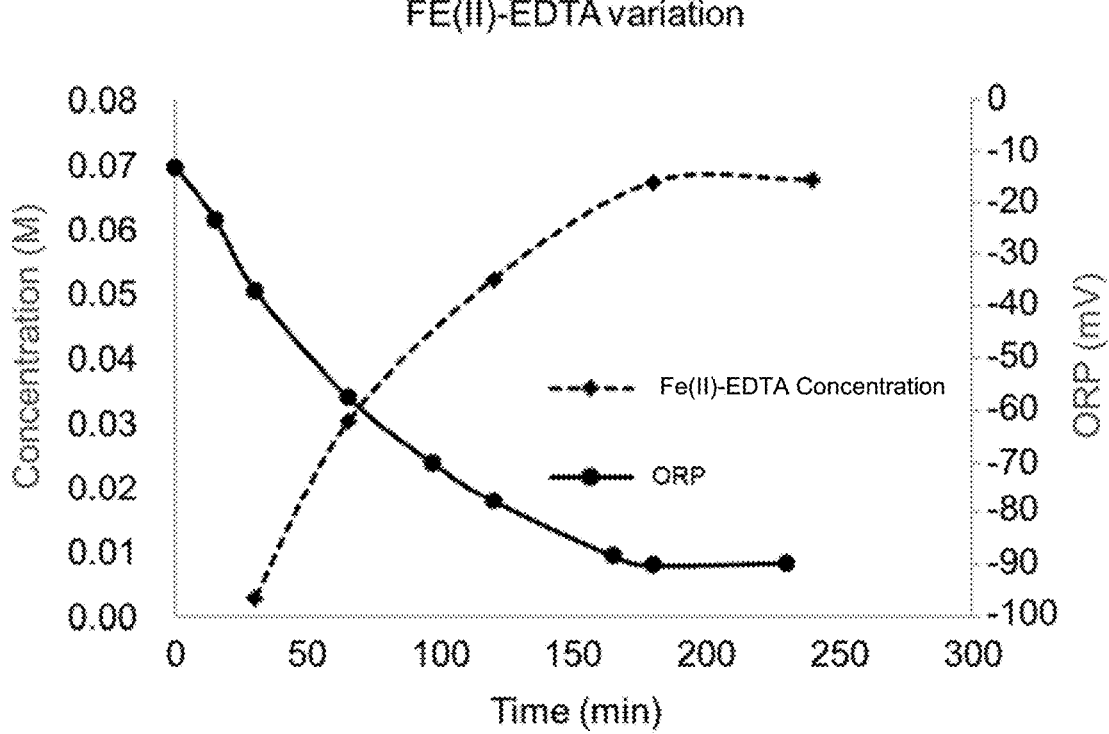
FIG. 21 presents the variation of the Fe(II)-EDTA concentration and of the redox potential of the solution during the electrolysis presented in Example 8(a).

The concentration of Fe(III)-EDTA in each sample during electrolysis was determined by diluting 1 mL of the sample in 10 mL of a 0.2 M EDTA in an LiOH solution (pH 7.70) and by measuring the absorbance of the solution at 470 nm. The total iron concentration was determined by making a 1000-fold dilution in water and adding the FerroVer™ iron reagent from the company Hach and measuring the absorbance at 510 nm. The difference between total iron and Fe(III)-EDTA made it possible to evaluate the concentration of Fe(II)-EDTA formed during electrolysis. FIG. 21 shows the variation in the concentration of Fe(II)-EDTA and the redox potential of the solution for 240 minutes of electrolysis.

It can be observed that as the concentration of Fe(II)-EDTA (formed by the reduction of Fe(III)-EDTA on the cathode) increases in the catholyte, the redox potential of the solution decreases. During electrolysis, the total cell current decreased from 600 mA to 300 mA.

It should be noted that it is possible to increase the current density of the cell by improving the mass transfer in the cell by well-known methods (such as the use of turbulence promoters, the increase in temperature, etc.) as well as by increasing the effective surface area of the cathode (for example, by the use of materials in the form of felts, grid, etc.). It is obvious that the choice of cathode material is not limited to graphite and other cathode materials (preferably those with high hydrogen overpotential) can be used.

(b) Relithiation of $FePO_4$ with the Electrochemically Generated Fe(II)-EDTA

Figure 22:
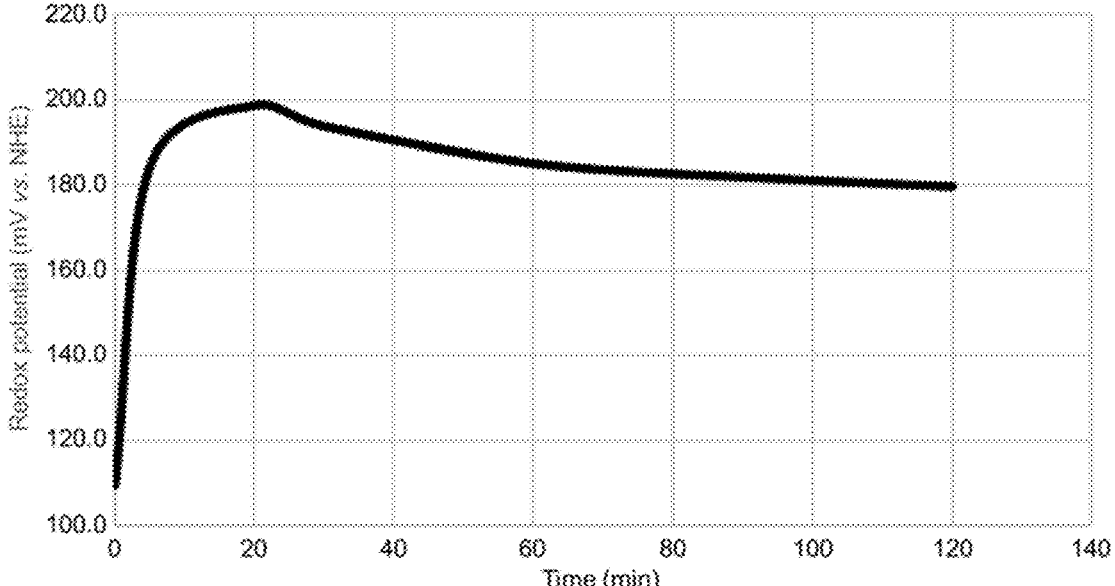
FIG. 22 shows the variation of the redox potential of the suspension during the reduction of $FePO_4$ by Fe(II)-EDTA generated by electrolysis of Fe(II)-EDTA according to Example 8(b).

The Fe(II)-EDTA solution obtained during the electrolysis with the FM01 cell in (a) was then used to carry out the $FePO_4$ relithiation. 50 mL of the solution were brought into contact with 0.32 g of the $FePO_4$ prepared in Example 1(a) under an argon atmosphere and at 40° C. The $FePO_4$ powder was kept in suspension using a magnetic stirrer and the decrease in concentration of Fe(II)-EDTA and the appearance of Fe(III)-EDTA were monitored using an ORP sensor placed in the suspension. FIG. 22 shows the variation of potential of the suspension during relithtiation. An increase in potential can be observed as Fe(II)-EDTA is oxidized to Fe(III)-EDTA (by reducing $FePO_4$ to $LiFePO_4$).

Figure 23:
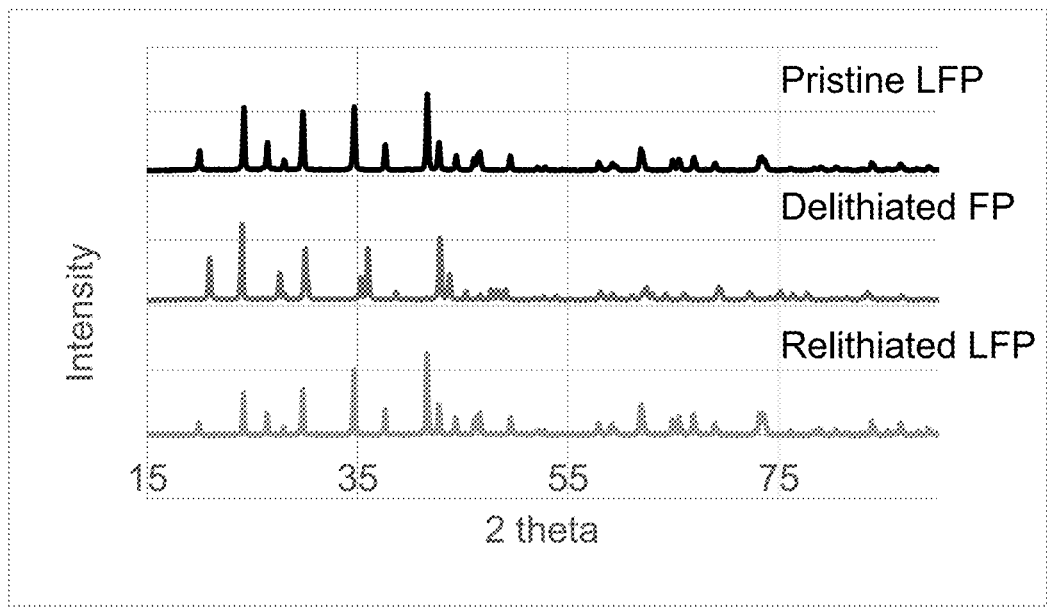
FIG. 23 shows the X-ray diffraction patterns of pristine $LiFePO_4$ (top), delithiated $LiFePO_4$ (middle) and relithiated $LiFePO_4$ (bottom) according to Example 8(b).

At the end of the assay, the solid was separated by vacuum filtration, washed, dried and analyzed by X-ray diffraction. Comparison of the diagrams of pristine $LiFePO_4$, delithiated $FePO_4$, and the solid obtained after contact with the Fe(II)-EDTA solution generated by electrolysis and in the presence of the lithium salt (FIG. 23) shows that the solid was completely relithiated to form $LiFePO_4$.

Numerous modifications could be made to any of the embodiments described above without departing from the scope of the present invention as contemplated. Any references, patents or documents in the scientific literature referred to in this application are incorporated herein by reference in their entirety for all purposes.

The invention claimed is:

1. A process for the electrochemical alkaliation of an electrochemically active material, the process comprising the steps of:

(i) adding the electrochemically active material to a solution containing a reducing agent and an alkali metal salt in a solvent to produce an alkaliated electrochemically active material;

(ii) separating the alkaliated electrochemically active material and the solution; and (iii) electrochemically treating the solution separated in step (ii) to regenerate the reducing agent in the solution; the process optionally further comprising drying the alkaliated electrochemically active material.

2. The process of claim 1, wherein the electrochemically active material comprises a metal oxide, metal phosphate, metal silicate, metal sulfate, or a partially alkaliated metal oxide, metal phosphate, metal silicate, or metal sulfate.

3. The process of claim 1, wherein the reducing agent is the reducing member of a redox couple having a lower redox potential than that of the electrochemically active material to be reduced.

4. The process of claim 3, wherein the redox couple is Fe (II)/Fe (III) based.

5. The process of claim 4, wherein the redox couple is selected from $$[Fe(CN)_6]^{3-}/[Fe(CN)_6]^{4-},$$

$[Fe(nta)]/[Fe(nta)]^-$, $[Fe(tdap)]^{2-}/[Fe(tdap)]^{3-}$, $[Fe(edta)]^-/[Fe(edta)]^{2-}$, $[Fe(citrate)]/[Fe(citrate)]^-$, $[Fe(TEOA)OH]^-/[Fe(TEOA)OH]^-$, and $[Fe(oxalate)]^+/[Fe(oxalate)]$.

6. The process of claim 1, wherein:

step (i) further comprises a step of deoxygenating the solution; and/or steps (i) and/or (iii) are carried out in the presence of a gas allowing to eliminate the presence of oxygen.

7. The process of claim 1, wherein the alkali metal salt is selected from an alkali metal sulfate and an alkali metal bicarbonate.

8. The process of claim 1, further comprising a step of adjusting the pH of the solution to a pH adapted to the electrochemically active material of step (i).

9. The process of claim 8, further comprising the electrochemically active material of step (a) is $FePO_4$, and the pH is adjusted to between 6 and 7.5.

10. The process of claim 1, wherein the solvent is an aqueous solvent.

11. The process of claim 1, wherein the electrochemical treatment step (iii) is carried out in an electrolytic cell by passing a current between at least one cathode and at least one anode.

12. The process of claim 11, wherein the electrolytic cell comprises at least one ionic or non-ionic separator installed between the anode and the cathode to protect the regenerated reducing agent and/or the electrolytic cell further comprises a system for keeping the solution deoxygenated.

13. The process of claim 12, wherein the system comprises an oxygen-free gas such as carbon dioxide, nitrogen, or argon.

14. The process of claim 1, wherein:

the electrochemically active material is in the form of a suspension in the solution of step (i), and step (ii) is carried out by filtration, centrifugation, or decantation, optionally followed by a washing step; or the electrochemically active material is comprised in an electrode material on a current collector, and step (ii) comprises removing the electrode from the solution, optionally followed by a washing step.

15. The process of claim 14, wherein the electrode material further comprises an electronically conductive material selected from the group consisting of carbon black, acetylene black, graphite, graphene, carbon fibers or nanofibers, carbon nanotubes, and a combination of at least two thereof.

16. The process of claim 14, wherein the electrode material further comprises a binder.

17. The process of claim 1, wherein the alkali metal salt is an alkali metal bicarbonate and step (i) is carried out in the presence of gaseous carbon dioxide.

18. The process of claim 1, wherein the alkali metal of the alkali metal salt is lithium.

* * * * *